US006916545B2

(12) United States Patent
Yano et al.

(10) Patent No.: US 6,916,545 B2
(45) Date of Patent: Jul. 12, 2005

(54) RESIN COMPOSITION, THERMOPLASTIC RESIN LAMINATE, AND PRODUCTION METHODS THEREOF

(75) Inventors: Shoichiro Yano, Ibaraki (JP); Takashi Sawaguchi, Yokohama (JP); Masatoshi Chikazawa, Tokyo (JP); Takashi Takei, Tokyo (JP); Tomohiro Ito, Kanagawa (JP); Masao Nakajima, Chiba (JP); Takashi Seino, Kanagawa (JP); Yasuaki Kai, Yokohama (JP); Shinkichi Torii, Kanagawa (JP); Kouichi Handa, Kanagawa (JP); Katsuhiko Suzuki, Kanagawa (JP); Kenji Uesugi, Kanagawa (JP)

(73) Assignees: Nissan Motor Co., Ltd., Yokohama (JP); Nihon University School Jurdical Person, Tokyo (JP); Tama-TLO Corporation, Tokyo (JP)

( * ) Notice: Subject to any disclaimer, the term of this patent is extended or adjusted under 35 U.S.C. 154(b) by 294 days.

(21) Appl. No.: 10/284,178

(22) Filed: Oct. 31, 2002

(65) Prior Publication Data

US 2003/0108734 A1 Jun. 12, 2003

(30) Foreign Application Priority Data

Oct. 31, 2001 (JP) ........................................ 2001-334592
Jun. 27, 2002 (JP) ........................................ 2002-188414

(51) Int. Cl.$^7$ .............................................. C08K 9/00
(52) U.S. Cl. ..................... 428/458; 428/521; 427/407.1; 427/408; 427/435; 523/200; 523/202; 523/209 OR; 523/211; 523/216; 525/274; 525/326.1; 525/330.7; 525/330.6
(58) Field of Search ................................ 428/458, 521; 427/407.1, 409, 435; 523/200, 202, 209 OR, 211, 216; 525/274, 326.1, 330.2, 330.6

(56) References Cited

U.S. PATENT DOCUMENTS 4,978,708 A * 12/1990 Fowler et al. .............. 524/507
5,520,852 A * 5/1996 Ikkala et al. ............ 252/519.21
5,641,503 A * 6/1997 Brown-Skrobot ........... 424/431
5,656,333 A * 8/1997 Truong et al. .............. 427/243
5,719,205 A * 2/1998 Yoshihara ................... 523/209
5,844,058 A * 12/1998 Sugama ...................... 527/300
5,866,043 A * 2/1999 Ikkala et al. ................ 252/500
5,883,019 A * 3/1999 Troung et al. .............. 442/166
6,013,587 A * 1/2000 Truong et al. .............. 442/166

FOREIGN PATENT DOCUMENTS

| JP | 6-71826 A | 3/1994 |
|---|---|---|
| JP | 6-316045 A | 11/1994 |
| JP | 7-47644 | 2/1995 |
| JP | 7-47644 B2 | 5/1995 |
| JP | 11-343349 A | 12/1999 |
| JP | 2000-44226 A | 2/2000 |

OTHER PUBLICATIONS

"Standard Test Methods for Flexural Properties of Unreinforced and Reinforced Plastics and Electrical Insulating Materials," ASTM Standards, Designation: D 790–02, pp. 1–9., 1989.
"Standard Test Method for Haze and Luminous Transmittance of Transparent Plastics", ASTM Standard, Designation: D 1003–00, pp. 1–6., 1991.
"Standard Test Methods for Determining the Izod Penduium Impact Resistance of Plastics", ASTM Standard, Designation: D 256–02, pp. 1–20., 1996.
Japanese Industrial Standard, "Test Method of Safety Glazing Materials for Road Vehicles", JIS R 3212, Japanese Standards Association, 1998, pp. 1–44.

* cited by examiner

Primary Examiner—Leszek B Kiliman
(74) Attorney, Agent, or Firm—Foley & Lardner LLP

(57) ABSTRACT

A resin composition to be used as a material for a various part of an automotive vehicle. The resin composition comprises a copolymer (A) formed by copolymerization of a first unsaturated monomer (a) and a second mononer (b). The first unsaturated monomer has a functional group which is bondable by hydrogen bond to a hydroxyl group. The second monomer is copolymerizable with the first unsaturated monomer. A metal oxide (B) is dispersed in the copolymer and having hydroxyl groups and hydrophobic groups at surface of the metal oxide.

47 Claims, 12 Drawing Sheets

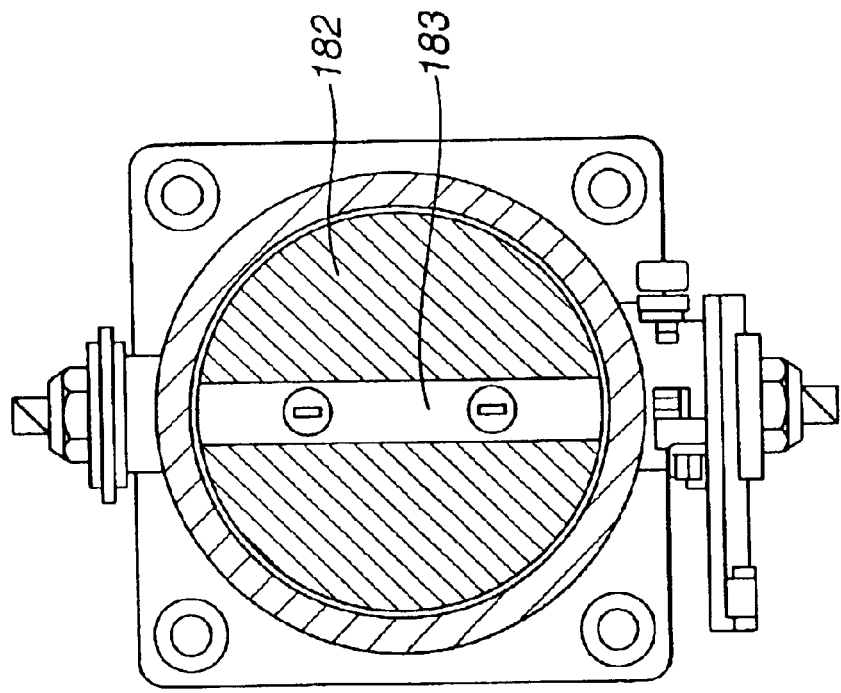
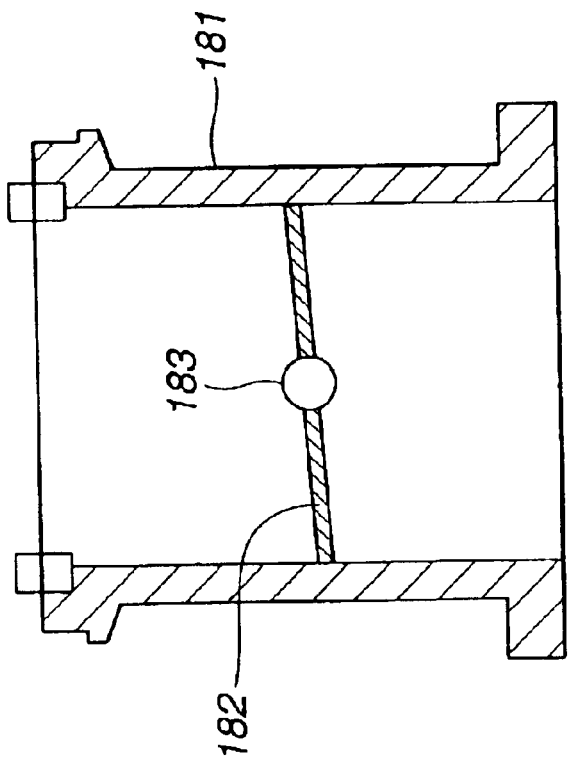
FIG.18B
FIG.18A

RESIN COMPOSITION, THERMOPLASTIC RESIN LAMINATE, AND PRODUCTION METHODS THEREOF

BACKGROUND OF THE INVENTION

This invention relates to a resin composition (C) of high transparency, impact strength, rigidity and surface hardness containing an oxide (B) having on its surface hydroxyl groups including ones subjected to a hydrophobicity-providing treatment, a thermoplastic resin laminate molded or formed from the resin composition (C) and having an appearance of high quality which is free from any distortion, and an exterior part formed from the same laminate for a vehicle, as well as a process for manufacturing the same.

Methacrylic, polycarbonate, styrene and epoxy resins are known as transparent resins which are useful for optical applications including the preparation of organic glass, or plastic lenses. Organic glass is characterized by its superiority to inorganic glass in impact resistance, lightness in weight and moldability, and the methacrylic resins have, among others, been increasing in the purposes and amount of use owing to their high light transmittance, low light scattering property, high transparency and high weatherability.

There have been developed a resin reinforced with conventional glass fiber, talc, etc., and a composition containing a composite material on a molecular basis for achieving improved physical properties, such as rigidity. For example, Japanese Patent Publication No. 7-47644 discloses a composite polyamide material containing a laminar silicate in a polyamide resin for improving the mechanical properties of an organic high molecular material, such as polyamide, and a process for manufacturing the same. Montmorillonite, which is a laminar clay, is used as a laminar silicate, and after it is impregnated with a raw material for nylon between its layers, polymerization is carried out to produce a composite material including a nylon polymer and a filler. It has a high content of a uniformly dispersed filler having a particle size in the order of nanometers, and is improved in rigidity and heat resistance without increasing in weight.

Japanese Patent Provisional Publication No. 11-343349 discloses a resinous window formed from a transparent resin composition obtained by adding fine particles of silica having a diameter not exceeding the wavelength of visible light to a transparent amorphous organic high polymer to improve its properties including rigidity. The resin composition composed of fine particles of silica and an organic high polymer is obtained by adding fine particles of silica dispersed in a solvent during the process of producing a transparent amorphous organic high polymer, while mixing the reactants, and causing sedimentation with a solidifying solvent, in which the polymerization reaction for producing a high polymer which may be suspension, solution, emulsion or bulk polymerization. Methyl methacrylate, etc. are disclosed as monomers for producing a transparent amorphous organic high polymer.

Japanese Patent Provisional Publication No. 6-316045 discloses synthetic resin safety glass obtained by employing a three-layer laminated sheet consisting of an acrylic resin sheet, a thermoplastic polyurethane sheet and a polycarbonate sheet and laying a laminated film consisting of an acrylic resin film and a polycarbonate film on each side of the acrylic resin sheet so that the acrylic resin film may contact the acrylic resin sheet. The invention disclosed therein is aimed at providing synthetic resin safety glass having an improved adhesion between its synthetic resin sheets and intermediate layers and preventing the loss of clarity or the transmission of a distorted image by its acrylic resin sheet at a high temperature in a hot pressing process and the scattering of any of its acrylic resin portions by a strong force of impact.

Japanese Patent Provisional Publication No. 6-71826 discloses a glazing material for vehicles having a hardened surface film formed directly or on a primer layer on the surface of a laminated structure composed of a layer of a specific glutarimide and methyl methacrylate copolymer, or a methacrylic resin and a layer of a transparent polymer of high impact strength, such as a polycarbonate.

SUMMARY OF THE INVENTION

The known organic glass and composite materials are, however, lower in rigidity than inorganic glass, and if they are used to make a large item of which a certain level of rigidity is required, such as a front window for a vehicle, it is necessary to make it with a large thickness contrary to the desired reduction in weight. The addition of a filler, such as glass fiber, to achieve an increased strength results in a reduction of transparency making it difficult to ensure visibility. A composite material made by dispersing laminar clay having a particle size in the order of nanometers instead of glass fiber, as described in Japanese Patent Publication No. 7-47644, is unsatisfactory in transparency, and may be undesirably colored. Moreover, it is not improved in rigidity as expected, but rather has an unsatisfactory interfacial strength between the filler and polymer, and is lower in impact resistance than organic glass not containing any filler.

Referring to the application of those organic resinous materials to products, organic glass has the advantage of being light in weight and allowing a high degree of freedom in molding as compared with the inorganic materials, but its drawbacks are a low rigidity due to a low elastic modulus, a reduction of quality in appearance due to distortion caused by the relaxation of the residual stress of the molding operation at a high temperature, and a low hardness making an easily damaged surface. Therefore, there is, for example, no transparent resinous material that is satisfactory in properties for application to windowpanes occupying a considerably large area in the exterior surface of an automotive vehicle, though there is a material used for a small part which may be relatively low in rigidity and is easily capable of surface treatment, such as the headlamp or sunroof. Referring to the resinous exterior or interior parts of an automotive vehicle, other than the windowpanes, there is a demand of increasing severity for improvements in physical properties and cost reductions, including a reduction of quality in appearance due to distortion, clearance narrowing, etc. caused by the relaxation of any residual stress at a high temperature, impact strength such as cracking resistance, and a reduction in weight of parts for an improved fuel consumption. Improvements by lamination have been under way in addition to any attempt relying upon a single resin alone for responding to such a demand for improvements in physical properties, and it is considered that lamination makes it possible to create a product of high added value at a low cost, and that unitary molding including any surrounding part makes it possible to achieve a reduction in the number of parts and thereby in the cost of manufacture.

Although the lamination of three kinds of transparent resins provides an improved impact strength, however, the laminated structure as described in Japanese Patent Provisional Publication No. 6-316045 is likely to show a reduction of quality in appearance due to unevenness caused by stretching at a high temperature in summer, or distortion caused by expansion when applied to any part forming the interior or exterior of an automotive vehicle, since maintaining the transparency does not allow the addition of any filler for restraining thermal expansion at an elevated temperature.

Japanese Patent Provisional Publication No. 6-71826 discloses a resinous window made by laminating acrylic and polycarbonate resins, etc., but its thermal expansion is difficult to restrain satisfactorily, since maintaining the transparency of the resins does not allow the addition of any filler for restraining their thermal expansion. The maintaining the transparency does not allow the addition of any filler for improved rigidity, such as glass fiber, but an increased thickness is required for improved rigidity with a resultant increase of weight contrary to the desired weight reduction.

Under these circumstances, it is an object of this invention to provide a resin composition (C) of improved impact resistance and rigidity, while retaining transparency and impact strength, and a process for manufacturing the same.

Another object of this invention is to provide a transparent, rigid and impact- and scratch-resistant resin laminate which is free from any thermal deformation or warpage at a high temperature, and a process for manufacturing the same. When an organic resinous material is used for making a large part, such as a window pane, door, or body panel for an automotive vehicle, it is necessary to make any such part with a large thickness, since the material is lower in rigidity than any inorganic material, and the use of resinous materials is not very effective for achieving a reduction of weight as an important object, though it may ensure a high degree of freedom in molding. Therefore, this invention is interned to provide a resin composition (C) exhibiting improved rigidity without calling for any increase in thickness, and therefore makes it possible to achieve a reduction in weight.

If an organic resinous material is used for making a large part, such as a windowpane for an automotive vehicle, it is necessary to employ a structural design for relieving any surrounding steel part from thermal strain, since the material undergoes heavier thermal deformation due to the relaxation of the residual stress of the molding operation at a high temperature than any inorganic material. If such a structure does not satisfactorily absorb any stretching caused by thermal deformation, a resinous pane may have a corrugated surface, or even crack. Thus, this invention is also intended to provide a resin composition (C) giving a resinous material less likely to be thermally deformed.

Moreover, an organic resinous material is lower in hardness than steel, and if it is used for making any part having a surface exposed to any contact by people, or any other different material, such as a window pane, outer panel, interior part for an automotive vehicle or a building material, it is necessary to form a resinous surface having an improved scratch resistance. Thus, this invention is also intended to provide a resinous material having high rigidity, a low coefficient of thermal expansion and high scratch resistance, and capable of being shaped as desired in accordance with design data and at a low cost, and a process for manufacturing the same.

A further object of the present invention is to provide an organic glass which exhibits a sufficient transparency though filler for improving the characteristics of the organic glass is contained in the organic glass.

An aspect of the present invention resides in a resin composition which comprises a copolymer (A) formed by copolymerization of a first unsaturated monomer (a) and a second mononer (b), the first unsaturated monomer having a functional group which is bondable by hydrogen bond to a hydroxyl group, the second monomer being copolymerizable with the first unsaturated monomer. A metal oxide (B) is dispersed in the copolymer and having hydroxyl groups and hydrophobic groups at surface of the metal oxide.

Another aspect of the present invention resides in a method of producing a resin composition (C). The method comprises: preparing a mixture liquid of a first unsaturated monomer (a) and a second mononer (b), the first unsaturated monomer having a functional group which is bondable by hydrogen bond to a silanol group, the second monomer being copolymerizable with the first unsaturated monomer, the second monomer being at least one selected from the group consisting of methacrylic monomer and acrylic monomer; mixing a metal oxide (B) in the mixture liquid, the metal oxide having silanol groups and hydrophobic groups at surface of the metal oxide; and polymerizing the first unsaturated monomer and the at least one selected from the group consisting of methacrylic monomer and acrylic monomer.

BRIEF DESCRIPTION OF THE DRAWINGS

FIG. 18A is a schematic vertical sectional view of a part of an automotive vehicle which part includes a movable portion and an unmovable portion which are formed using the resin composition according to the present invention;

FIG. 18B is a schematic transverse sectional view of the part of FIG. 18A; and

DETAILED DESCRIPTION OF THE INVENTION

Figure 1:
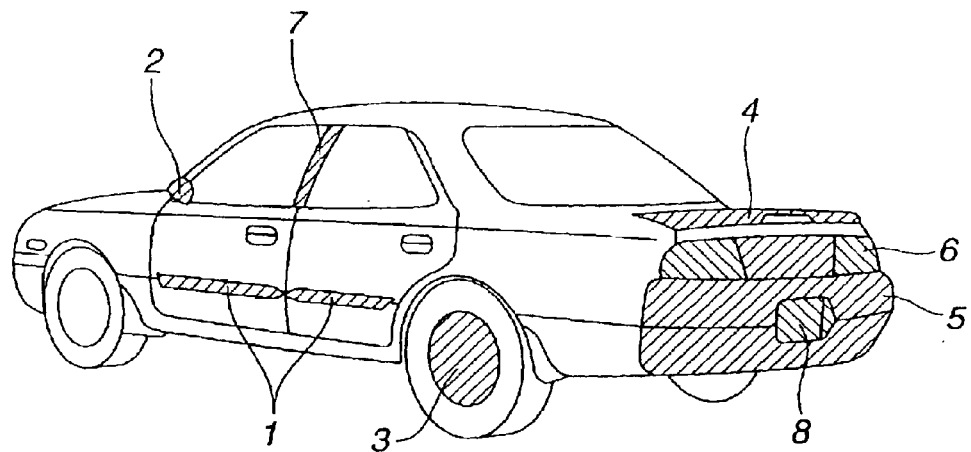
FIG. 1 is a schematic perspective view of an automotive vehicle whose exterior parts are formed using a resin composition according to the present invention.

According to a first aspect of this invention, there is provided a resin composition comprising a copolymer (A) formed by copolymerization of a first unsaturated monomer (a) and a second mononer (b), the first unsaturated monomer having a functional group which is bondable by hydrogen bond to a hydroxyl group, the second monomer being copolymerizable with the first unsaturated monomer. Additionally, a metal oxide (B) is dispersed in the copolymer and having hydroxyl groups and hydrophobic groups at surface of the metal oxide. In other words, the resin composition of the first aspect comprises the copolymer (A) of an unsaturated monomer (a) having functional groups capable of forming hydrogen bonds with hydroxyl group, and another monomer (b) copolymerizable with the unsaturated monomer. Additionally, the oxide (B) is dispersed in the copolymer (A) and has on its surface hydroxyl groups including ones subjected to a hydrophobicity-providing treatment.

The unsaturated monomer (a) forming the copolymer (A) used for the purpose of this invention and having functional groups capable of forming hydrogen bonds with hydroxyl groups may be any polymerizable unsaturated monomer without any particular limitation if it has functional groups capable of forming hydrogen bonds with hydroxyl groups. According to this invention, the unsaturated monomer (a) is preferably an unsaturated monomer having functional groups capable of forming hydrogen bonds with silanol groups (—Si—OH). The unsaturated monomer (a) is highly reactive with the oxide (B) so that silica compound can be stably blended in the resin composition under a sufficient interfacial interaction between them.

Referring more specifically to the "functional groups capable of forming hydrogen bonds with hydroxyl groups (functional groups bondable by hydrogen bonds with hydroxyl groups)" in the unsaturated monomer (a) used for the purpose of this invention, they are preferably either one of hydroxyl group, amide group, amino group, imino group, epoxy group, ether group, carbonyl group, carboxyl group or sulfonic acid group. They can form stronger hydrogen bonds. The unsaturated monomer (a) may contain a plurality of such functional groups in one molecule, and they may all be the same, or may be two or more kinds of different functional groups.

Examples of the unsaturated monomers (a) are not only ones containing carboxyl groups, such as methacrylic and acrylic acids (hereinafter referred to simply as (meth)acrylic acids, but also ones containing hydroxyl groups, such as hydroxyethyl (meth)acrylate, hydroxypropyl (meth)acrylate and hydroxybutyl (meth)acrylate, ones containing amide groups, such as (meth)acrylamide and N-methylol (meth) acrylamide, ones containing amino groups, such as aminoethyl methacrylate and diethylaminoethyl (meth)acrylate, ones containing epoxy groups, such as glycidyl (meth) acrylate and allyl glycidyl ether, ones containing carbonyl groups, such as methyl vinyl ketone and methyl isopropenyl ketone, ones containing ether groups, such as ethoxyethyl (meth)acrylate, methyl vinyl ether and ethyl vinyl ether, and ones containing sulfonic acid groups, such as styrene sulfonate and sulfopropyl (meth)acrylate.

The other monomer (b) forming the copolymer (A) may be any monomer not specifically limited if differs from the unsaturated monomer (a) and is copolymerizable therewith, and examples are a styrene resin and a methacrylic or acrylic monomer, and a methacrylic or acrylic monomer is preferred because it is high in transparency. The methacrylic monomer is methacrylic acid or a derivative thereof, and differs from the unsaturated monomer (a), while the acrylic monomer is acrylic acid or a derivative thereof, and differs from the unsaturated monomer (a). Examples of the methacrylic and acrylic monomers include esters prepared from (meth) acrylic acid and aliphatic alcohol having 1 to 12 carbon atoms and having a straight or branched chain, such as methyl (meth)acrylate, ethyl (meth)acrylate, isopropyl (meth)acrylate, n-butyl (meth)acrylate, isobutyl (meth) acrylate, n-amyl (meth)acrylate, isoamyl (meth)acrylate, n-hexyl (meth)acrylate, 2-ethylhexyl (meth)acrylate, octyl (meth)acrylate, decyl (meth)acrylate, dodecyl (meth) acrylate and octadecyl (meth)acrylate. They also include esters prepared from (meth)acrylic acid and cyclic alcohol having 5 to 7 carbon atoms, such as cyclopentyl (meth) acrylate, cyclohexyl (meth)acrylate and cycloheptyl (meth) acrylate. They also include esters prepared from (meth) acrylic acid and aromatic alcohol, such as phenyl (meth) acrylate and benzyl (meth)acrylate. They may be used alone, or in a mixture or combination of two or more kinds.

According to this invention, it is preferable for the other monomer (b) to consist mainly of methyl methacrylate for a balance of transparency, rigidity, hardness, etc. It is more preferable for the other monomer (b) to contain 70 to 100%, and still more preferably, 70 to 99%, by mass of methyl methacrylate.

The copolymer (A) is preferably formed by polymerization using the unsaturated monomer (a) in the range of 0.1 to 30% by weight, and more preferably, 1 to 10% by weight based on the weight of copolymer. No copolymer containing only less than 0.1% by weight of unsaturated monomer (a) may be expected to have any improved interfacial interaction with any oxide (B) to be described, particularly any finely divided silica compound, and any copolymer containing over 30% by weight of unsaturated monomer (a) may be more likely to absorb moisture, and become lower in dimensional stability and durability.

The copolymer (A) obtained by the copolymerization of the unsaturated monomer (a) and the other copolymer (b) is preferably made thermoplastic by the proper selection of the monomers to be used. A thermoplastic copolymer is high in moldability.

This invention is characterized in that the oxide (B) having on its surface hydroxyl groups including ones subjected to a hydrophobicity-providing treatment is dispersed in the copolymer (A). The copolymer (A) contains functional groups capable of forming hydrogen bonds with hydroxyl groups, and the hydrogen bonds formed between those functional groups and the hydroxyl groups of the oxide (B) promote the interfacial interaction between the two. The hydroxyl group may be in the form of a silanol group, which it forms with silicon.

The oxide (B) to be used according to this invention has hydroxyl groups or silanol groups at its surface and is, however, required to have hydrophobicity-providing treatment given to a part of hydroxyl or silanol groups existing at the surface. It has been found that such a hydrophobicity-providing treatment improves the dispersibility of the oxide (B) in the copolymer (A) to enable the uniform dispersion of a satisfactorily large amount of oxide (B). If no hydrophobicity-providing treatment is given, the insufficient concentration of the silica compound dispersed in the copolymer (A) during the manufacture of the resin composition makes it impossible to expect any satisfactory result of its addition.

An oxide of a Group IV element, such as titanium, zirconium or silicon, or of a Group III element, such as aluminum, is preferably used as the compound having hydroxyl or silanol groups, and more specifically, silica, titania, alumina, zirconia, etc. may preferably be used, while a composite oxide (B) obtained by, for example, treating the surface of titania with alumina can also be used. According to this invention, the use of silica is preferred because of its easy availability, low cost, easy hydrophobicity-providing treatment, etc.

The hydrophobicity-providing treatment is the treatment of fine particle silica having hydroxyl or silanol groups with any of various silicone compounds, such as silanes, silazanes or siloxanes. For example, n-butyltrichlorosilane and n-butyltrimethoxysilane are silicone compounds having one substituted alkyl group. Dimethyldichlorosilane, n-butylmethyldichlorosilane and n-decylmethyldichlorosilane are silicone compounds having two substituted alkyl groups. Silicone compounds having three substituted alkyl groups include n-decyldimethylchlorosilane, ethyldimethylchlorosilane, n-octadecyldimethylchlorosilane and n-octadecyldimethylmethoxysilane. The alkyl groups which these silicone compounds contain are hydrophobic, and the oxide (B) thereby made hydrophobic is highly compatible with an organic resin, and its improved affinity for the matrix resin enables silica to be uniformly dispersed in the matrix resin.

More specifically, the oxide (B) may be obtained by a liquid-phase process including dispersing an oxide for the hydrophobicity-providing treatment in a solvent such as cyclohexane, and adding a silicone compound as a hydrophobicity-providing agent for treatment under reflux. After the reaction, its product is washed in cyclohexane. The solvent in which the oxide for the hydrophobicity-providing treatment is dispersed may be selected from among paraffin hydrocarbons, such as pentane, hexane, heptane and octane; cycloparaffin hydrocarbons, such as cyclobutane, cyclopentane and cyclohexane; and aromatic hydrocarbons, such as methyl ethyl ketone, toluene, xylene, acetone and benzene. The oxide for hydrophobicity-providing treatment is dispersed at a concentration of 10 to 45% by weight in the solvent. The degree of hydrophobicity-providing treatment depends upon the hydrophobicity-providing agent used, its concentration and the reflux time. A preferred reaction temperature is 40 to 200 deg. C. (° C.), and a preferred reflux time is at least 0.5 hour. If the hydrophobicity-providing agent contains chlorine, a catalyst may be used for the hydrophobic reaction to collect any hydrogen chloride produced. Pyridine can be used as the catalyst in the proportion of 0 to 300 parts by weight relative to 100 parts by weight of hydrophobicity-providing agent containing chlorine.

A reaction for such a hydrophobicity-providing treatment can also be carried out by a vapor-phase process including heating fine particle of silica in a vacuum line to remove adsorbed water therefrom, introducing vapor of a silicone compound as mentioned before as a hydrophobicity-providing agent, and heating the whole at a temperature of 200 to 300 deg. C. The degree of the hydrophobicity-providing treatment depends upon the hydrophobicity-providing agent employed and the amount in which it is introduced. If silica for hydrophobicity-providing treatment is in the form of a colloid dispersed in water, it is necessary to replace any such water by an organic solvent, such as methyl ethyl ketone, to avoid any reaction with water. Such a method of dewatering is disclosed in Japanese Patent Provisional Publication No. 2000-44226. The oxide (B) to be used according to this invention may be prepared not only by any process as described above, but also by any other process.

The oxide (B) thus prepared may be a single compound, or a mixture or combination of two or more compounds. According to this invention, it is preferable to use as the oxide (B) a silica compound having on its surface silanol groups including ones subjected to hydrophobicity-providing treatment. It imparts rigidity, while retaining transparency. The silica compound is not particularly limited in particle shape, but may not only be in a common or substantially spherical shape, but also be in the form of a rectangular parallelepiped, a plate shape, a straight shape like fiber, or a branched shape. Irrespective of their shape, however, the average of the lengths of the longest portions as measured along a straight axis of the particles of the silica compound (hereinafter referred to as the long diameter) is preferably not more than 380 nm, or the wavelength of visible light, more preferably from 1 to 200 nm and still more preferably from 5 to 100 nm. The range not exceeding 380 nm ensures the transparency of the resin composition (C) of this invention. The range of 1 to 200 nm is beneficial for transparency and rigidity, as well as for easy availability and low cost.

According to this invention, the resin composition (C) preferably contains the oxide (B) in the range of 0.1 to 30%, and more preferably 1 to 30% by weight. If its proportion is less than 0.1% by weight, it can hardly be expected to achieve any improved rigidity, and at a proportion over 50% by weight, it may bring about a reduction in transparency, an increase in specific gravity and a reduction in impact strength.

The resin composition (C) of this invention containing the oxide (B) dispersed in the copolymer (A) is preferably such that the unsaturated monomer (a) is one having functional groups capable of forming hydrogen bonds with silanol groups, and that the oxide (B) is a silica compound having on its surface silanol groups including ones subjected to hydrophobicity-providing treatment, while the other monomer (b) is a methacrylic and/or acrylic monomer. The silanol groups on the surface of a finely divided silica compound form strong hydrogen bonds with the functional groups existing in the (meth)acrylic copolymer as derived from the unsaturated monomer, and thereby improve an interfacial interaction between the copolymer and the silica compound and thereby the rigidity of the resin composition (C). Although a filler added to a polymer may be likely to lower its impact strength, the resin composition (C) of this invention has only a practically small reduction in impact strength owing to the strong interfacial interaction ensured by the hydrogen bonds formed between the functional groups in the copolymer and the hydroxyl or silanol groups in the oxide (B) added thereto.

In the infrared absorption spectrum of the silanol group on the surface of the silica compound to which the unsaturated monomer has been adsorbed, the peak indicating the expansion and vibration of —O—H in the silanol group preferably has a shift ($\Delta \nu OH$) of at least 300 $cm^{-1}$. Therefore, the formation of a hydrogen bond can be determined by measuring the peak shift ($\Delta \nu OH$) in the infrared absorption spectrum. The silanol group remaining free on the surface without forming any hydrogen bond has a peak of —O—H at 3747 $cm^{-1}$, and it shifts to a lower frequency if a hydrogen bond is formed.

Although there is no particularly limited process for manufacturing the resin composition (C) of this invention, it is preferable to mix the oxide (B) in a mixed solution of the unsaturated monomer (a) and the other monomer (b) and copolymerize the unsaturated monomer (a) and the other monomer (b) in their mixed solution if the unsaturated monomer (a) is one having a functional group capable of forming a hydrogen bond with a silanol group, while the other monomer (b) is a methacrylic and/or acrylic monomer, and if the oxide (B) is a silica compound having on its surface silanol groups including ones subjected to the hydrophobicity-providing treatment. According to a second aspect of this invention, therefore, there is provided a process for manufacturing the resin composition (C), in which a silica compound having on its surface silanol groups including ones subjected to the hydrophobicity-providing treatment is mixed in a mixed solution of an unsaturated monomer having a functional group capable of forming a hydrogen bond with a silanol group and a methacrylic and/or acrylic monomer, and the unsaturated monomer is polymerized with the methacrylic and/or acrylic monomer.

More specifically, the unsaturated monomer (a) and the methacrylic and/or acrylic monomer are mixed together in an adequate solvent, or without the aid of any solvent; the silica compound, or its dispersion in an adequate solvent is mixed in the monomer mixture; and a polymerization initiator is added to start polymerization. A preferred solvent depends upon the method of polymerization, but may, for example, be water, methyl ethyl ketone, toluene, methyl acetate, ethyl acetate or butyl acetate. The polymerization initiator can also be selected from among the known substances, and preferred examples are azobisisobutyronitrile and benzoyl peroxide.

The polymerization can be carried out by a method selected from among common methods for radical polymerization, such as bulk, solution, suspension or emulsion polymerization, depending upon the intended use of the product, the facilities which are available, etc., and suspension or emulsion polymerization is preferable for a product intended for molding use. If the silica compound added for polymerization does not have a surface which is partly hydrophobic, it is dispersed in a greater amount in an aqueous solvent, and the resin composition (C) does not have a satisfactorily high content of silica compound for improved rigidity. According to this invention, however, the use of a silica compound having a partly hydrophobic surface makes it possible to avoid any such problem and select an industrially desirable method for polymerization.

The resin composition (C) of this invention may further contain any of various additives, such as an antistatic agent, an oxidation inhibitor, a heat stabilizer, an ultraviolet absorber, a flame retardant, a pigment and a coloring agent, if required.

According to a third aspect of this invention, there is provided a thermoplastic resin laminate comprising at least one layer of each of a resin composition (C) as described above and a thermoplastic resin (D), the composition (C) and the resin (D) forming alternating layers. If the resin layers are bonded together by e.g. an adhesive, the characteristics of the individual layers are damped or absorbed by the adhesive layer, have only a lower effect on any adjoining resin layer and do not extend to the whole laminate. In the laminate of this invention, however, the resin layers are welded together by heat, the characteristics of the individual layers, such as rigidity, are utilized to cover their drawbacks, such as thermal deformation, to improve the rigidity of the laminate, so that it may be possible to restrain in the whole laminate any warpage caused by the relaxation of any residual stress in the layers at a high temperature.

A combination of layers containing different proportions of the silica composition in the resin compound (C) gives a laminate having a wide variety of characteristics. For example, a laminate has high impact and scratch resistance if its outermost layer contains a high proportion of the silica compound. If both of its uppermost and lowermost layers contain a high proportion of the silica compound, the laminate is of high rigidity and its upper and lower layers produce a binding force to restrain any thermal deformation by any residual stress at a high temperature. If its middle layer contains a high proportion of the silica compound, the laminate is of high rigidity and exhibits a greater force for restraining thermal deformation. If its upper layer contains a high proportion of the silica compound, while its lower layer contains a low proportion thereof, so that it may contain a varying proportion of the silica compound, the laminate has a varying distribution of rigidity which makes it possible to control the direction of any distortion caused by thermal deformation, though it may alternatively possible for the upper layer to contain a lower proportion of the silica compound. Thus, as the laminate is made by the heat welding of the resin composition (C) and the thermoplastic resin (D), it is possible to rely upon the characteristics of the individual layers for raising the elastic modulus of the laminate and improving its impact strength and rigidity, and if its outermost layer, or any adjoining layer contains a high proportion of silica, the laminate has a high scratch resistance, while the formation of layers producing a binding force makes it possible to restrain any thermal deformation, overcome any surface roughening by distortion or deformation and improve the quality of its surface appearance. Moreover, the silica compound suppresses the thermal expansion of the resin layers and of the laminate as a whole. If the resin layers are not welded, but are bonded together by e.g. an adhesive, the characteristics of the individual layers are damped or absorbed by the adhesive layer, have only a lower effect on any adjoining resin layer and do not extend to the whole laminate.

The laminate may contain silica compound whose surface has been modified, in every layer, or only in a part of its resin layers, such as its surface or bottom layer. It is preferable for every layer to contain it for the improved rigidity of the laminate. It is also possible to vary its proportion from the upper to the lower layer, depending upon the purpose for which the laminate is intended. In any event, the laminate is of high impact resistance, high rigidity, low thermal expansibility and improved scratch resistance and resists any distortion even at a high temperature if it is a thermoplastic resin laminate comprising at least one layer of each of the resin composition (C) and the thermoplastic resin (D), the resin composition (C) and the thermoplastic resin (D) forming alternating layers.

The thermoplastic resin (D) may be a polycarbonate resin, a styrene resin, poly-4-methylpentene-1, a thermoplastic polyurethane resin, etc., though a polycarbonate resin is, among others, preferred. The polycarbonate resin is a polymer derived from a divalent phenol compound, such as bisphenol A, and may be produced by a phosgene process, ester interchange, or solid-phase polymerization. It may not only be a known polycarbonate resin, but may also be a polycarbonate resin produced by polymerization in an ester interchange process.

The laminate has a thickness of 0.5 to 10 mm, and preferably 1 to 5 mm. With a thickness below 0.5 mm, the laminate may fail to retain its shape even if it may contain a higher proportion of silica. With a thickness over 10 mm, the laminate may not have its middle layer bound effectively, but may be distorted at a high temperature and present a poor appearance. The resin layers in the laminate may each be of any suitable thickness selected from within the range stated above in accordance with the use for which it is intended, and the properties which it is required to have.

The laminate of this invention is preferably manufactured by forming under heat or pressure, though there is no particular limitation. According to a fourth aspect of this invention, therefore, there is provided a process for manufacturing a laminate by forming under heat and/or pressure. For example, a first process employs an extruder suited for the resin composition (C) and the thermoplastic resin (D), and comprises co-extruding molten resins into sheets through a T-die having a number of slits depending upon the number of layers to be formed, and welding every two adjoining resin layers together under heat. The extruder and T-die are held at substantially the same temperature, and though each sheet of the resin (D) or the resin composition (C) may have a very thin solidified film formed on its surface when all the sheets meet to form a laminate, the sheets have their surfaces melted again by the internal heat of the resin and have a mixed layer formed between every two joining surfaces by the diffusion of the composition (C) and the resin (D), so that the laminate may have its layers bonded together firmly.

According to a second process, single-layer sheets of the resin composition (C) and the resin (D), or a laminate as made by the first process is heated in a press machine having a heating plate, and is compression formed to form a laminate. The laminate of this invention can be made by compression forming a plurality of single-layer sheets together. According to the second process, it is preferable to insert a removable panel heater between every two adjoining surfaces, heat those surfaces into a molten state and remove the heater before compression forming.

A third process employs a two-color injection molding machine having a mold movable back and forth to define a cavity having a variable volume, and comprises injection molding a single-layer sheet of the resin composition (C), retracting the mold immediately, and during or immediately after the retraction of the mold, injecting the resin (D) into an empty cavity formed by its retraction. Although the resin composition (C) may have a very thin solidified film formed on its surface, the heat of the molten resin (D) injected thereonto melts the film again and the diffusion of the resin composition (C) and the resin (D) forms a mixed layer defining a strong joining surface therebetween. These steps are repeated to form a laminate having any desired laminated structure. If the mold temperature and the injection temperature of the resin are set 20 to 50 deg. C. higher than for any ordinary injection molding, the laminate has its layers welded together. A process which is suitable for the size of the laminate to be made, the number of layers to be formed, etc. may be selected from the processes as described.

The resin composition (C) and the resin (D) forming the laminate may further contain various additives, such as an antistatic agent, an oxidation inhibitor, a heat stabilizer, an ultraviolet absorber and a flame retardant, if they are required to make a laminate having their properties without lowering its transparency, and it is possible to make a laminate having a colored layer and a transparent layer if its lower layer is formed as a colored layer containing a pigment, or coloring agent, and is laminated with a transparent layer.

According to a fifth aspect of this invention, there are provided a molded product of the resin composition (C), or thermoplastic resin laminate as described above for an interior or exterior part of an automotive vehicle, an outer panel for the vehicle and a resinous window for the vehicle.

Figure 2A:
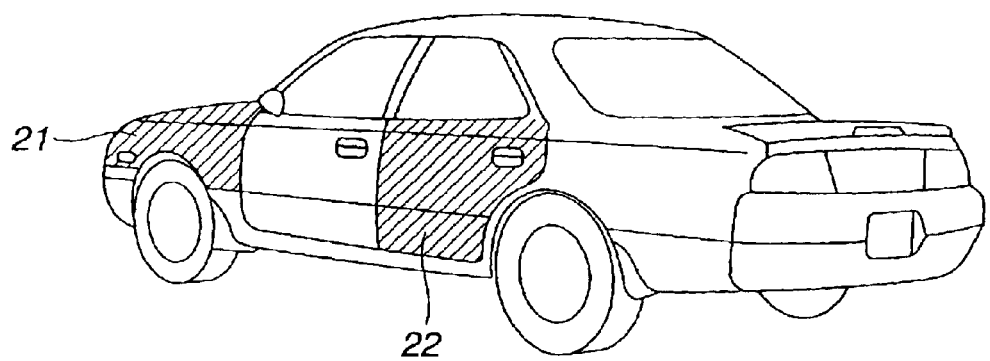
FIG. 2A is a schematic perspective view similar to FIG. 1 but showing the automotive vehicle whose outer panels are formed using the resin composition according to the present invention.
Figure 2B:
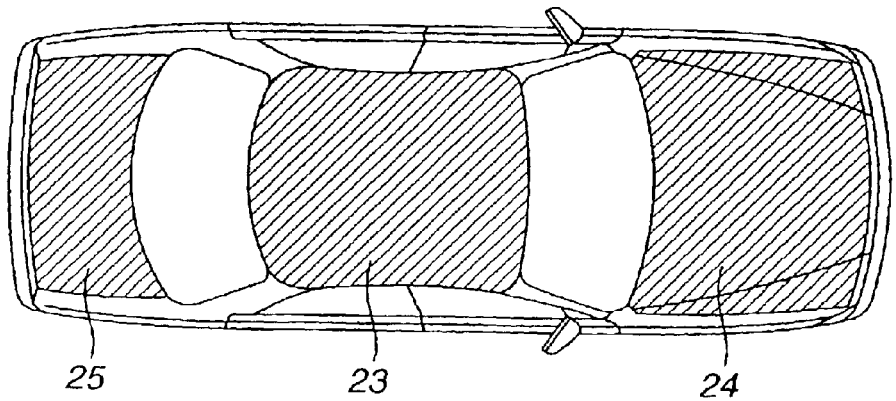
FIG. 2B is a schematic plan view of the automotive vehicle of FIG. 2A.
Figure 3:
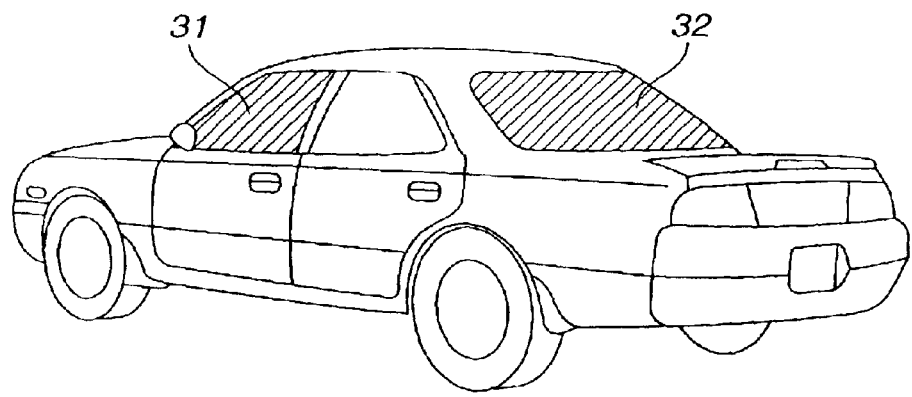
FIG. 3 is a schematic perspective view of the automotive vehicle whose window is formed using the resin composition according to the present invention.

The resin composition (C) or laminate of this invention is suitable for making an exterior part of an automotive vehicle or its outer panel owing to its high transparency and rigidity, and its substantial freedom from any distortion even at a high temperature. For example, FIG. 1 shows molded parts forming the exterior parts of an automotive vehicle, including door moldings 1, frames 2 for door mirrors, wheel caps 3, a spoiler 4, bumpers 5, winker lenses 6, pillar garnishes 7, a rear finisher 8 and headlamp covers (not shown), and FIGS. 2A and 2B show outer panels for the automotive vehicle, including front fenders 21, door panels 22, a roof panel 23, a hood panel 24, a trunk lid 25 and back door panels (not shown). It is also applicable to a front windowpane not shown, side windowpanes 31 and a rear windowpane 32, as shown in FIG. 3.

According to this invention, it is possible to mix a coloring agent, such as a pigment, in the resin composition (C) or incorporate a colored layer in the laminate to make a product having any desired color tone, as stated above. The laminate of this invention may be a transparent one not containing any colored layer, or a laminate composed of transparent and colored layers. Therefore, it is useful for not only an automotive vehicle as explained above, but also for any other application calling for an appearance of high quality including pleasantness, smoothness and clarity, as well as high rigidity and scratch resistance, such as the preparation of any exterior or interior material of a building, or an interior material of a railroad car.

Any such product including a part for a vehicle, or a part forming an interior material of a building can be manufactured by any suitable process, such as injection molding, or vacuum and pressure forming, depending upon the product to be made. Although a common glass fiber-reinforced resin undergoes a gradual lowering in physical properties and is lowly recyclable, because of the destruction of glass fiber subjected repeatedly to shearing stress, the transparent resin composition (C) of this invention has only a limited degree of lowering in physical properties owing to the silica compound which makes it hardly susceptible to any shearing stress.

The laminate of this invention can also be formed by a known resin molding process, such as vacuum forming, vacuum and pressure forming, hot compression molding or blow molding, to make resin glass, an exterior part of an automotive vehicle, such as an outer panel, or an interior part. It is also possible to make a molded product forming an interior or exterior part of an automotive vehicle by injection or compression molding if the laminate is placed in a mold and if a resin is fed into the mold to form a unitary product with the outer periphery of the laminate. Unitary molding enables any intended product to be made without calling for any complicated process.

According to a sixth aspect of this invention, there are provided a resinous wiper system, a resinous door mirror stay and a resinous pillar each comprising the resin composition as described above. The resin composition of this invention is suitable for use in making any item required to ensure an improved visibility for a driver, such as a wiper system, or pillar, owing to its high rigidity, heat resistance, dimensional stability after heating or molding, and transparency.

A conventional wiper system has been made of steel having a black finish coating and black rubber, and has often lowered visibility when working at a low speed. Conventional door mirror stays have been formed from a resin having a finish coating in the same color with the outer plate, or a black color, and have often lowered visibility during a right or left turn of the vehicle. Conventional pillars have been of steel, and the front and center pillars have often lowered visibility when the vehicle is normally running, or makes a right or left turn, and the rear pillars when the vehicle moves back, or when the driver checks to ensure safety behind the vehicle. Although the use of a transparent resinous material for any such item improves visibility, it has been difficult to satisfy high rigidity, heat resistance and dimensional stability after heating or molding with any conventional transparent resinous material. The resin composition of this invention is a transparent material of high rigidity and low thermal expansibility or contractibility, and its use overcomes the above problems. The transparency of any such part contributes not only to its improved visibility, but also to its improved ornamental quality.

Figure 4:
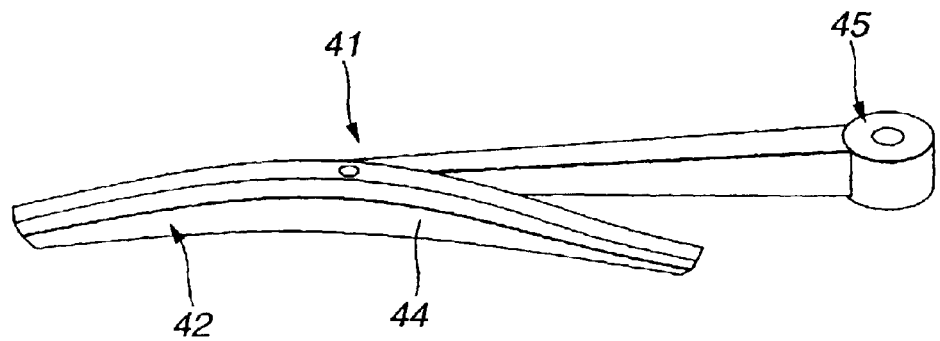
FIG. 4 is a schematic perspective view of a wiper system formed using the resin composition according to the present invention.

FIG. 4 is a diagram showing a wiper system by way of example. It has a wiper arm 41 and a wiper blade 42, and is movable along a half arc about a nut hole 45 for securing the wiper arm. Wiper blade 42 is usually composed of an elastic supporting portion 43 and a soft rubber portion 44, and the resin composition of this invention is used as a transparent material for at least one of the wiper arm, wiper blade and wiper blade supporting portion in a wiper system according to this invention. It is preferable to use, for example, silicone rubber having high durability and a relatively high transparency for the rubber portion in the wiper system of this invention. A resin composition obtained by adding an adequate amount of acrylic rubber to the resin composition of this invention may be used for making the wiper blade supporting portion. It imparts an adequate elasticity to the wiper blade supporting portion. Such a resin composition is obtained by, for example, adding 0.5 to 30 parts by weight of a copolymer of acrylic rubber whose main component is ethyl acrylate or butyl acrylate (e.g. Nipol AR31, AR32 of Nippon Zeon Co., Ltd. ) to 100 parts by weight of the resin composition of this invention.

The door mirror stay or the resinous pillar of this invention is not only a door mirror stay, or pillar molded from the resin composition of this invention as a transparent material, but may also be composed of a multi-layer laminate formed by laminating the resin composition of this invention with another resin. Such a laminate has at least one layer formed from the resin composition of this invention, and preferably has its outermost and lowermost layers, and more preferably a middle layer, too, formed from the resin composition of this invention. The multi-layer laminate has additional functions other than those given by the resin composition of this invention. The thickness of each individual layer in the laminate may be so selected as to suit the thickness of a final product and the number of the layers. A polyester, polyamide or polycarbonate resin may be used as another resin for forming such a laminate. The thermoplastic resin laminate of this invention can also be used as the multi-layer laminate. There is no particular limitation in a process for manufacturing a door mirror stay, or resinous pillar by using the resin composition of this invention or the multi-layer laminate as described. While it is possible to make a door mirror stay, or pillar as a discrete item, it is also possible to make it as a part of an integrally molded combination, such as a combination of a door mirror stay and a front pillar, or of a pillar and a resinous roof panel, by a process to be described later, if it is useful as a door mirror stay, or pillar.

According to a seventh aspect of this invention, there is provided a molded or formed resin product having a transparent portion and an opaque portion, at least the transparent portion containing the resin composition as described above. The resin composition of this invention is suitable for use in making an integrally molded resin product having a transparent portion and an opaque portion, owing to its high rigidity, heat resistance, dimensional stability after heating or molding, chemical resistance and transparency. The molded resin products will be described by reference to parts for an automotive vehicle.

An automotive vehicle contains a mixture of transparent parts, such as lamps, covers and panes, and opaque parts, such as outer panels and interior parts. It has been difficult to form a unitary combination of transparent and opaque parts from any conventional resinous material, since those parts are required to exhibit different properties including transparency, rigidity, heat resistance, low linear expansibility, low molding contractibility and chemical resistance. The resin composition of this invention is, however, easy to use for injection molding, or vacuum and pressure forming, and can be used as a transparent material for making an integrally molded or formed combination of transparent and opaque portions, while ensuring high rigidity, high heat resistance, low linear expansibility, low molding or forming contractibility and high chemical resistance, to thereby reduce the numbers of parts and process steps and decrease the weight of parts. The integral molding or forming of transparent and opaque portions combines the conventionally divided contour lines of any part into a single continuous line and thereby improves its outward appearance. More specifically, head lamps of which transparency is required are surrounded by other opaque parts, such as a bumper, a front grill, a fender and a hood. Their integral molding makes it possible to reduce the number of parts and thereby the number of steps in an assembly process. The resin composition of this invention is so high in heat resistance that there is no fear of the resin being melted by a nearby source of heat in a lamp. A conventional headlamp formed from a polycarbonate resin has called for a surface coating, since it is so low in light resistance as to undergo yellowing by exposure to sunlight. Such a problem can be overcome by using the resin composition of this invention.

Figure 5:
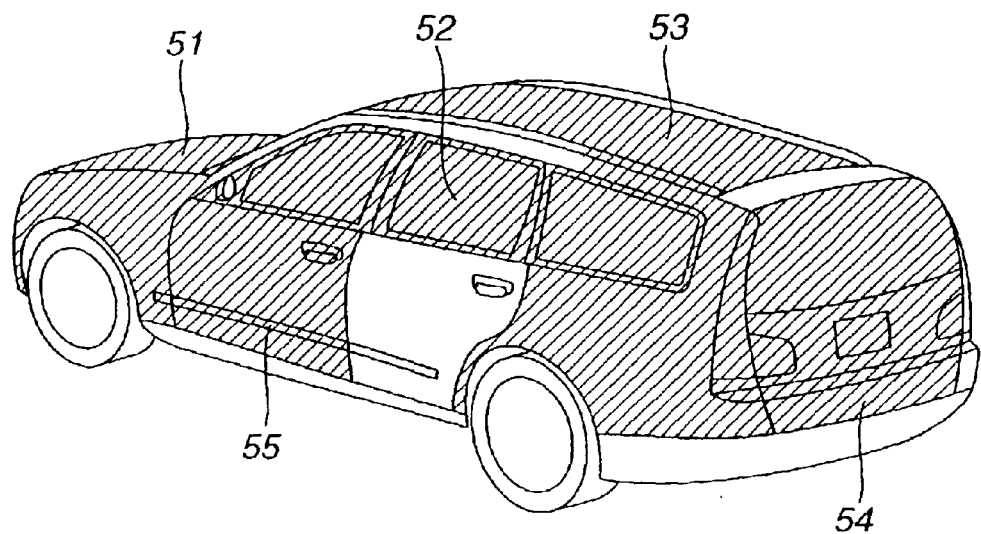
FIG. 5 is a schematic perspective view of an automotive vehicle whose exterior parts are formed using the resin composition according to the present invention.

There is no particular limitation in a process for manufacturing such a molded or formed resin product. Glass parts for an automotive vehicle are examples of parts of which transparency is required, and they are known as side and back door panes attached to the doors, rear quarter panes attached to the rear fenders and roof, and rear panes. The side or back door pane is of the construction having a sheet of glass disposed between the door outer and inner. It is possible to mold or form an integral combination of door outer and inner and glass by defining a hollow cavity between the door outer and inner, and pouring the resin composition of this invention into the cavity. It is possible to make an integral combination of a pillar garnish and a rear quarter pane in a similar way. Molded resin products according to this invention are shown in FIG. 5, and include not only an integral resin molded combination of pillar garnish and rear quarter pane as mentioned, but also an integral resin molded or formed combination 51 of lamp, hood and fender, an integral resin molded combination 52 of pillar garnish and pane, an integral resin molded combination 53 of roof, fender and pane, an integral resin molded or formed combination 54 of back door and pane and an integral resin molded combination 55 of door and pane. Door locks, a wiper motor, etc. may be installed in the hollows of the relevant parts later.

Figure 6:
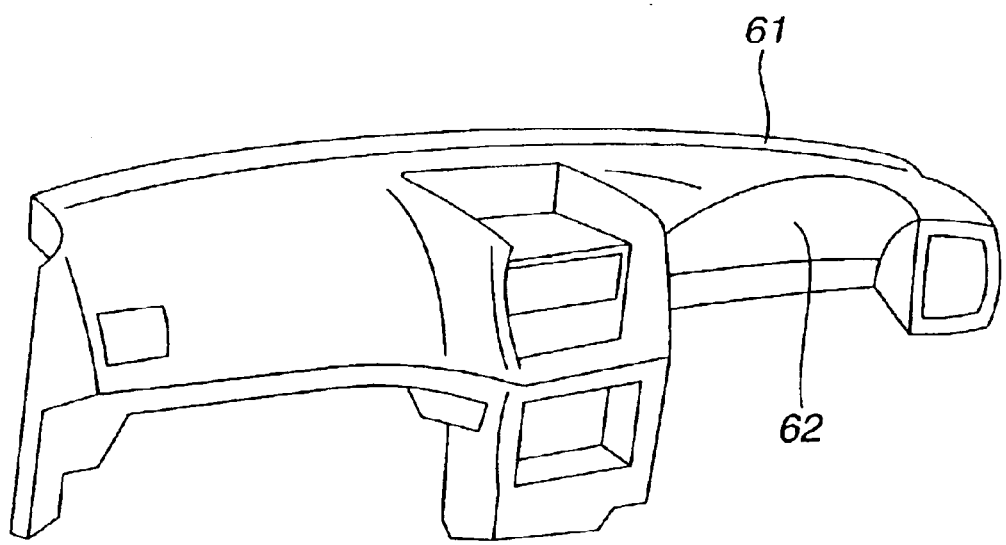
FIG. 6 is a schematic perspective view of an instrument panel including a transparent portion and an opaque portion which are integrally formed using the resin composition according to the present invention.

As regards an instrument panel in an automotive vehicle, it has been usual to prepare instruments, a transparent cover therefore and a cluster lid as separate parts. If an integral combination of transparent and opaque resin portions is molded by using the resin composition of this invention, it is possible to prepare an integral assembly of an instrument panel 61 and an instrument cover 62 and combine several kinds of parts into the instrument panel to thereby reduce the number of parts and achieve a weight reduction. Such an instrument panel is schematically shown in FIG. 6.

The resin composition of this invention can also be used to make a molded or formed resin product of high strength and rigidity having a transparent portion and an opaque portion. For example, the resin composition of this invention can be used to make a transparent roof portion without providing a glass sunroof. The opaque portion of any such molded product may or may not be colored.

The molded or formed resin product of this invention having a transparent portion and a colored opaque portion may be made by, for example, using a colored resin, painting or printing a color on the opaque portion, or employing a colored sheet of an opaque resin.

A colored resin may be prepared by dispersing a pigment in a resin, or by kneading a molten mixture of resin and pigment pellets and injecting it into a mold in an injection molding machine. Such a colored resin may be used to make a molded resin product according to this invention by opening the mold or forming a new molten resin passage, and injecting a molten transparent resin into the mold cavity through a separate cylinder. Thus, it is possible to make a molded resin product having a transparent portion and a colored opaque portion. Either a transparent resin or an opaque resin may be injected first.

An opaque portion colored by painting or printing may be formed by molding an intended resin product from a molten transparent resin and painting or printing the front or rear side of the molded product to color it and make it opaque. It is alternatively possible to paint or print a color before shaping a molten resin.

A colored sheet of an opaque resin may be used to make a molded resin product according to this invention by shaping a colored opaque resin sheet preliminarily, placing it in a mold, injecting a molten transparent resin into the mold, cooling the resin to solidify it and removing the whole from the mold.

The process described above makes it possible to produce, for example, an integral resin molded combination of roof, fender and pane not only in such a way that the pane is transparent, while the roof and fender are opaque, but also in such a way that an upper portion of the pane and a portion of the roof are transparent, while the fender and the remaining portions of the pane and roof are opaque.

Although the molded or formed resin product having an integral combination of transparent and opaque portions according to this invention can be formed from the resin composition of this invention and a pigment, it may also be composed of a multi-layer laminate formed by laminating the resin composition of this invention with another resin. Such a laminate has at least one layer formed from the resin composition of this invention, and preferably has its outermost and lowermost layers, and more preferably a middle layer, too, formed from the resin composition of this invention. The multi-layer laminate provides additional functions not achieved by the resin composition of this invention alone. The other resin forming the multi-layer laminate and the thickness of each layer may be so selected as to suit the purpose for which the molded resin product is intended.

According to an eighth aspect of this invention, there are provided a resinous window with a heating element or wire, a resinous mirror, a resinous lamp reflector, a resinous cover or case in an engine compartment, and a resinous part of a cooling system.

Figure 7:
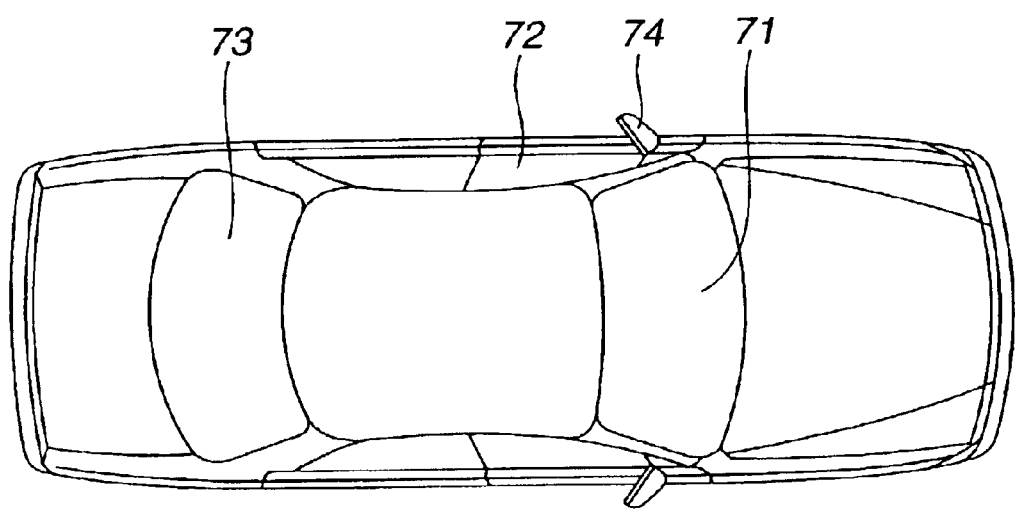
FIG. 7 is a schematic plan view of an automotive vehicle which is provided with resinous mirrors and resinous windows which are formed using the resin composition according to the present invention.

The resin composition of this invention is suitable for use in making parts, such as a window, a mirror, a lamp reflector, or a cover or case in an engine compartment, owing to its high rigidity, high heat resistance, dimensional stability after heating or molding, chemical resistance and transparency, and makes it possible to achieve a reduction in the numbers of parts and process steps and weight. The resin composition of this invention can be used as a transparent material to replace the material for any part required to be clear, so that its clouding may be prevented for improved visibility. For example, a resinous window, such as a front window 71, a door window 72 or a rear window 73 as shown in FIG. 7, is often provided in its molded product or on its surface with a heating element heater for heating it to prevent its clouding. Although a conventional transparent resinous material has presented problems of heat resistance and thermal expansion in the presence of heat by a heating element heater, no such problem occurs from the use of the resin composition according to this invention. Owing to its high rigidity, the resin composition of this invention is applicable to a large item, such as front window 71, door window 72 or rear window 73, to reduce its weight. A heating element heater may be formed by, for example, insert molding or forming a heating element prepared in film form, or forming a heating element on the inner surface of the window by vapor deposition, coating or printing. The transparent resin of this invention can also be used to make a side mirror 74 (FIG. 7) which is lighter in weight than one of any conventional glass or transparent resin, and which can be equipped with a heat-ray heater to avoid clouding. It is also applicable to a room mirror.

Figure 8:
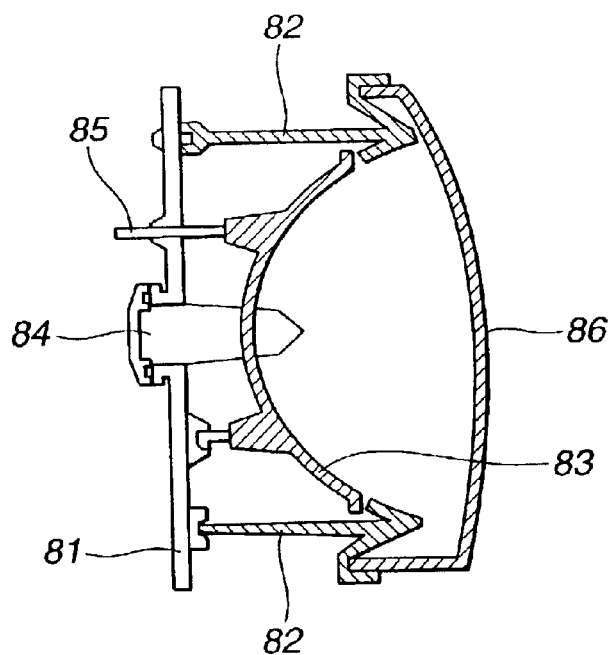
FIG. 8 is a schematic cross-sectional view of a head lamp including a resinous lamp reflector formed using the resin composition according to the present invention.

FIG. 8 is a cross sectional view of a lamp for an automotive vehicle. A reflector 83 is mounted in an outer member 82 secured to a base 81 on the vehicle body, and a bulb 84 and an optical axis regulator 85 are connected to the reflector, while an outer lens 86 is fitted on the outer member. Although a reflector formed from any conventional resinous material has often been inferior in heat resistance, linear expansibility and linear expansion anisotropy, the use of the resin composition according to this invention overcomes those problems. Owing to its high rigidity, the resin composition of this invention makes a lamp reflector which is light in weight and high in heat resistance, as well as in dimensional stability and surface smoothness, and which is suitable as a reflector for a head, fog, or rear combination lamp, or a sub-reflector for a head lamp. Its reflecting portion may be formed by, for example, insert molding a reflecting film during the manufacture of the member, or forming a reflecting film by vapor deposition after injection or press molding the member.

Figure 9:
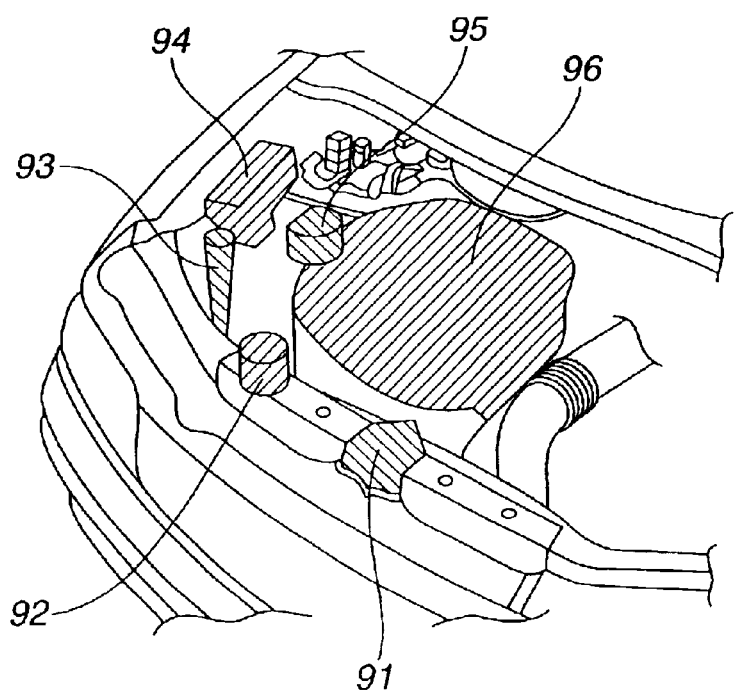
FIG. 9 is a schematic fragmentary perspective view of an automotive vehicle, showing parts in an engine compartment which parts are formed using the resin composition according the present invention.
Figure 10:
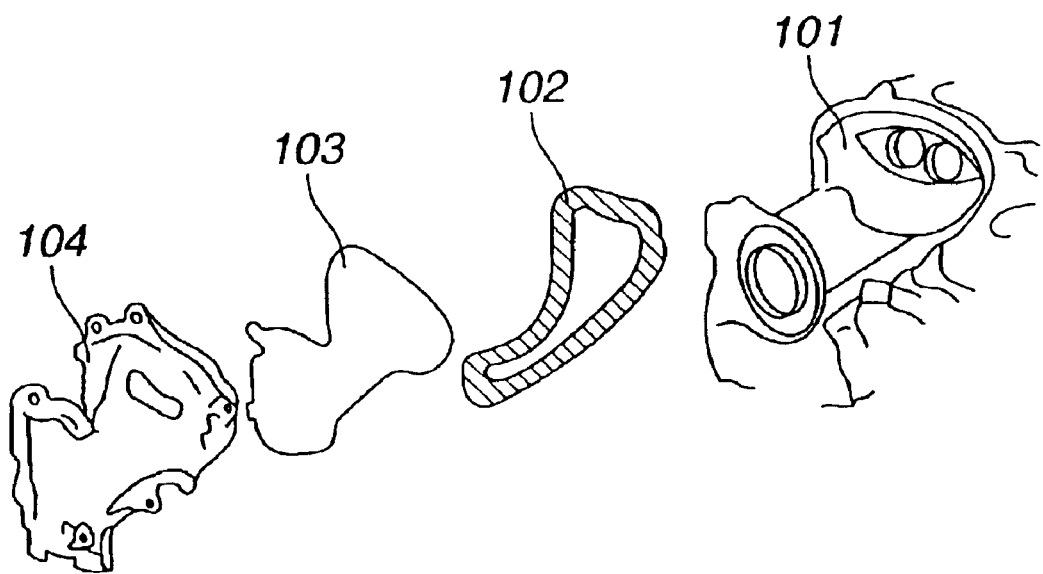
FIG. 10 is a schematic exploded perspective view of a mechanism in the engine compartment, the component parts of the mechanism being formed using the resin composition according to the present invention.

The resin composition of this invention is also applicable to covers or cases in an engine compartment. The inside of an engine compartment is shown in FIGS. 9 and 10. Owing to its high transparency, heat resistance, chemical resistance and rigidity, the resin composition of this invention can make various parts of light weight which can withstand use in an engine compartment having severe temperature conditions. Examples of such parts are a radiator 91, a coolant reservoir tank 92, a washer tank inlet 93, a housing 94 for electrical parts, a brake oil tank 95, a cylinder head cover 96, an engine body 101, a timing chain 102, a gasket 103 and a front chain case 104. Owing to its transparency, the resin composition of this invention improves the visibility of the inside of a tank or cover, such as the washer tank inlet, housing for electrical parts, brake oil tank, cylinder head cover, or timing belt cover.

Figure 11:
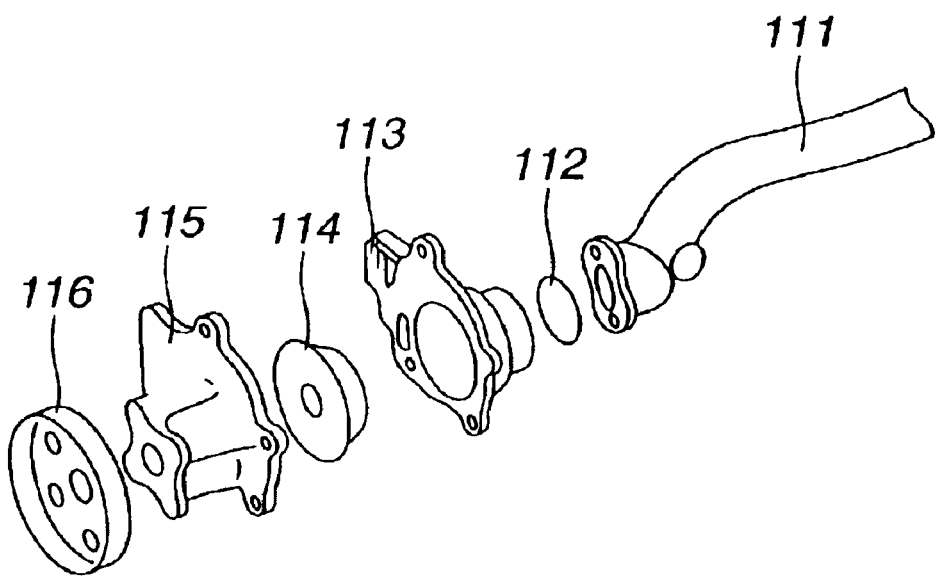
FIG. 11 is a schematic exploded perspective view showing resinous parts of a cooling system which parts are formed using the resin composition according the present invention.
Figure 12:
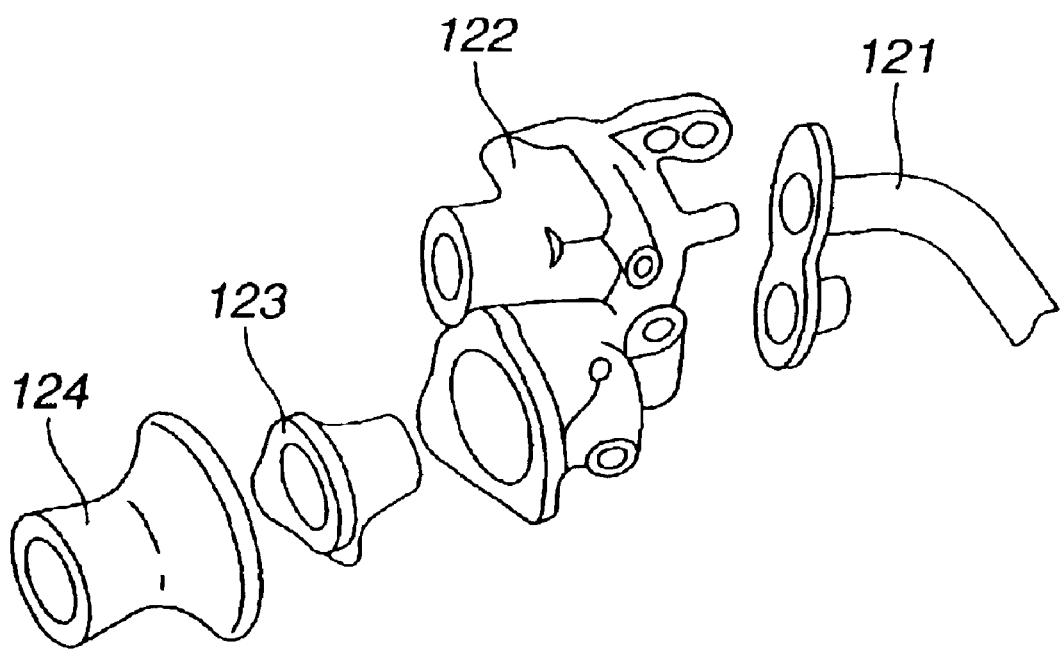
FIG. 12 is a schematic exploded perspective view showing resinous parts of the cooling system which parts are formed using the resin composition according to the present invention.
Figure 13A:
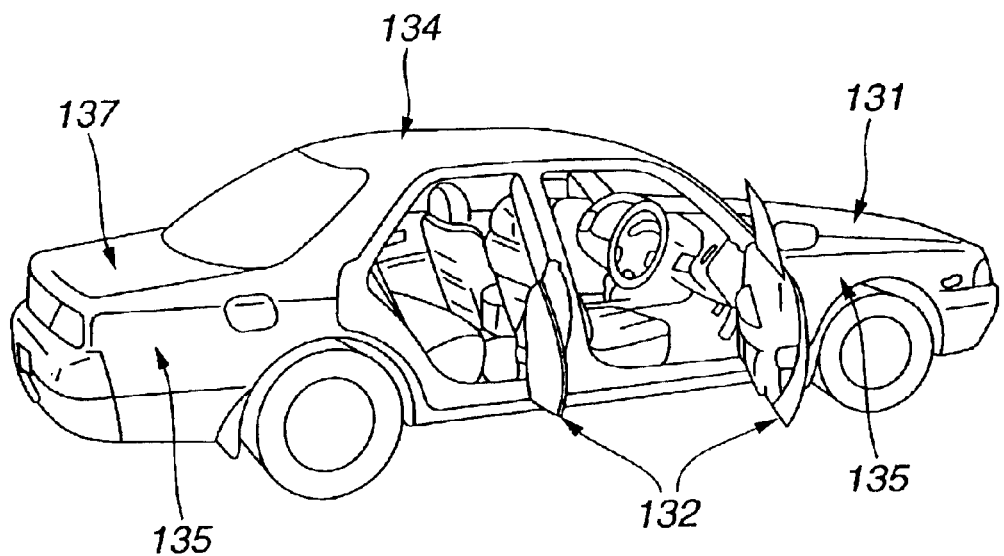
FIG. 13A is a schematic perspective view of an automotive vehicle provided with exterior parts which have a hollow structure and are formed using the resin composition according the present invention.
Figure 13B:
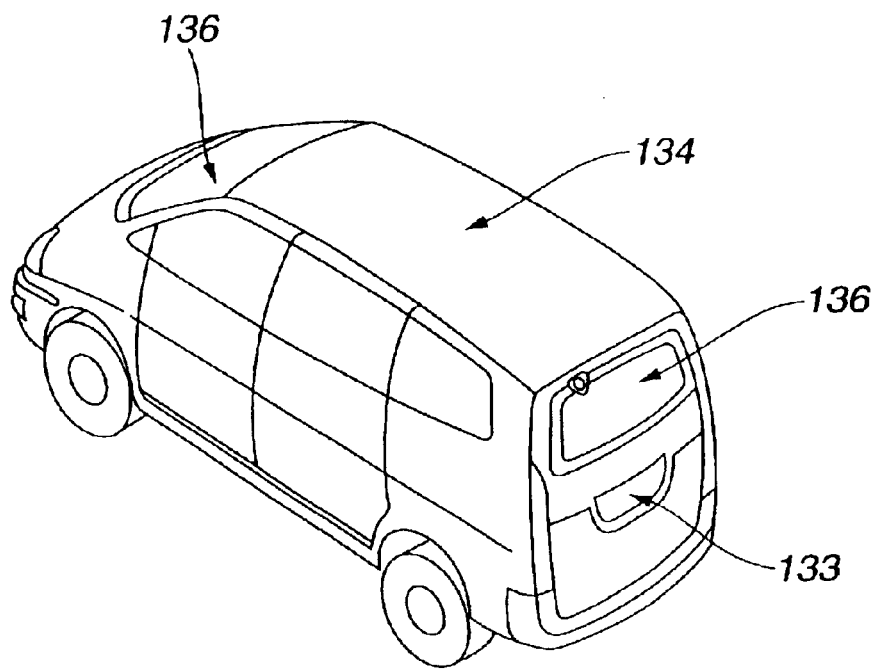
FIG. 13B is a schematic perspective view of an automotive vehicle provided with exterior parts which have a hollow structure and are formed using the resin composition according to the present invention.
Figure 14A:
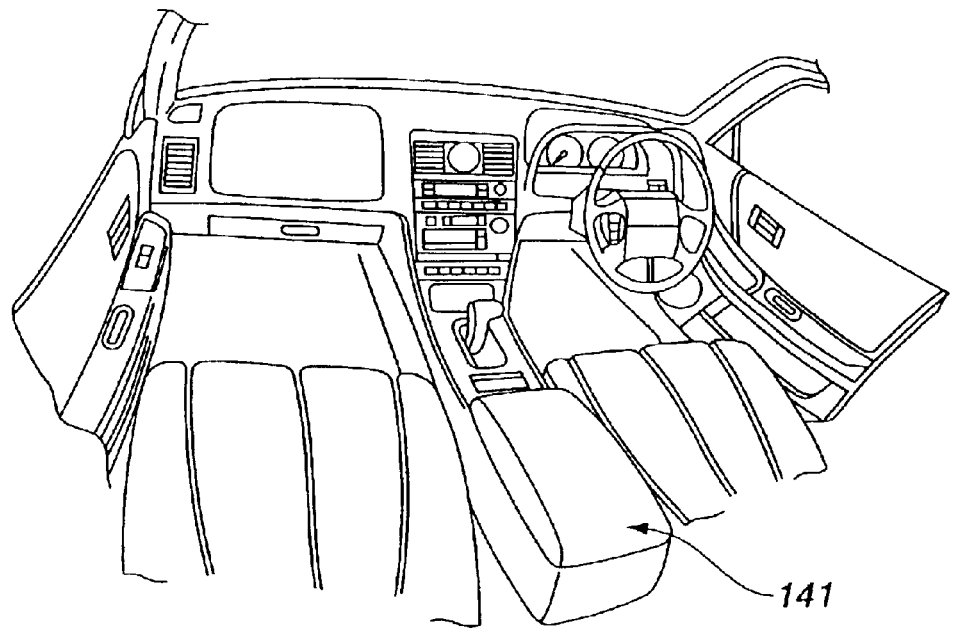
FIG. 14A is a schematic perspective view showing the inside of a passenger compartment of an automotive vehicle, provided with an interior part which is formed using the resin composition according to the present invention.
Figure 14B:
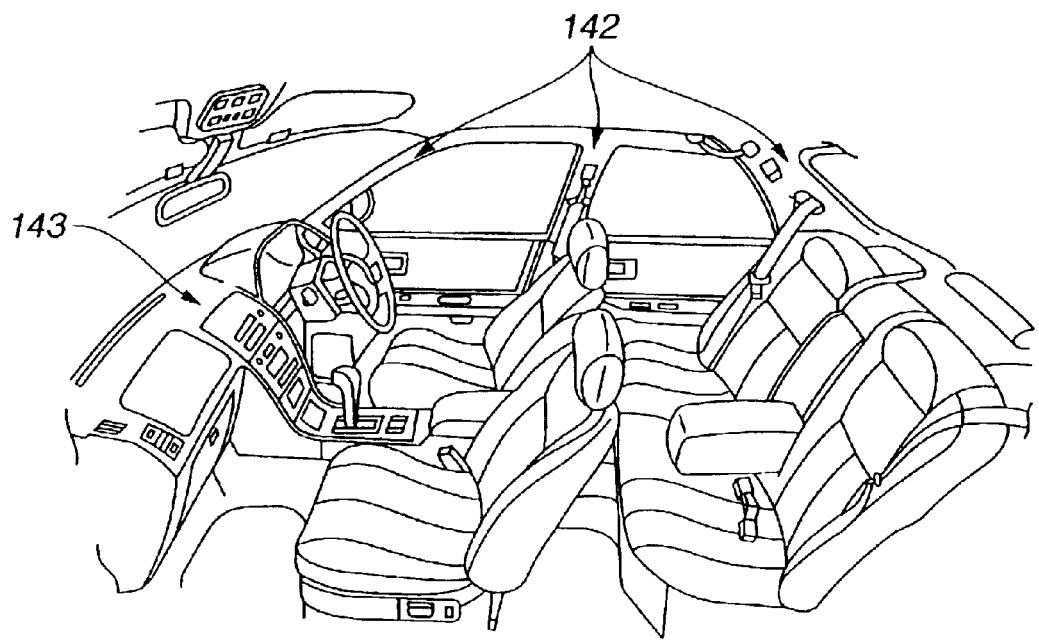
FIG. 14B is a schematic perspective view showing the inside of a passenger compartment of the automotive vehicle of FIG. 14A, provided with interior parts which are formed using the resin composition according to the present invention.

The resin composition of this invention can make parts of light weight and high heat and chemical resistance and rigidity which are suitable as parts used in contact with cooling water in an engine compartment for an automotive vehicle. Such resinous parts for a cooling system are shown in FIGS. 11 and 12. They are parts for the top and base of a radiator tank and valves, such as a water pipe 111, an O-ring 112, a water pump housing 113, a water pump impeller 114, a water pump 115 and a water pump pulley 116 which are shown in FIG. 11, and a water pipe 121, a thermostat housing 122, a thermostat 123 and a water inlet 124. The resin composition is of high value in practical use owing to a weight reduction, an improved chemical resistance and an improved fuel consumption.

Although every part described above can be formed from the resin composition of this invention alone, it may also be composed of a multi-layer laminate formed by laminating the resin composition of this invention with another resin. Such a laminate has at least one layer formed from the resin composition of this invention, and preferably has its outermost and lowermost layers, and more preferably a middle layer, too, formed from the resin composition of this invention. The multi-layer laminate provides additional functions not achieved by the resin composition of this invention alone. The other resin forming the laminate and the thickness of each layer may be so selected as to suit the purpose for which each part is intended.

According to a ninth aspect of this invention, there is provided an integrally molded or formed resin product comprising the resin composition as described above and having a hollow structure communicating with the open air and/or a closed hollow structure. Owing to its high rigidity, heat resistance and dimensional stability after heating or molding as stated, the resin composition of this invention is suitable for any part having a hollow structure, such as a door, roof or hood. Many of the parts forming the interior and exterior of an automotive vehicle have a hollow structure defined by steel plates and resin panels for accommodating an auxiliary device, etc. For example, a side or back door has a hollow structure formed by an outer and an inner steel plate, and has a resin panel attached to the inner steel plate during an assembly process after painting, while an auxiliary devices or devices are installed in the hollow structure. A roof, hood, trunk lid, or back door has an outer plate and a reinforcement formed from steel plates, and a resinous part attached to its inside after painting. All of these parts having a hollow structure have been difficult to mold of formed as unitary products from any conventional resinous material, since they are large and have to be of high rigidity and dimensional stability. The resin composition of this invention having high rigidity, low thermal expansibility and low thermal contractibility, however, enables the molding of any such part as a unitary product and thereby makes it possible to achieve a reduction in the number of the parts, the number of process steps and the weight of the parts.

Although the integrally molded or formed resin product of this invention can be formed from the resin composition of this invention alone, it may also be composed of a multi-layer laminate formed by laminating the resin composition of this invention with another resin. Such a laminate has at least one layer formed from the resin composition of this invention, and preferably has its outermost and lowermost layers, and more preferably a middle layer, too, formed from the resin composition of this invention. The multi-layer laminate provides additional functions not achieved by the resin composition of this invention alone. The other resin forming the multi-layer laminate and the thickness of each layer may be so selected as to suit the purpose for which each product is intended. The thermoplastic resin laminate of this invention can be used as such a multi-layer laminate.

The integrally molded or formed resin product of this invention has an improved commercial value if a skin, or an ornamental or decorative layer as formed by a printed design, is formed on its outermost layer to improve its design, feel and quality. For example, a molded product having a skin formed on its outermost layer by a napped sheet, a sheet having an embossed pattern, a sheet having a pattern formed by laser, or a sheet having a pattern like the grain of wood, is useful as, say, the inner portion of a roof, a pillar garnish, or an instrument panel. A multi-layer laminate as described above may have a printed design layer as its middle layer, and present a lustrous or deep appearance if its surface layer is formed from a transparent material.

The integrally molded or formed resin product of this invention having a hollow structure has an improved heat-insulating and sound-proofing property if its hollow interior is filled with a gas, liquid or solid, or a mixture thereof. The filling material is preferably a gas, such as nitrogen, argon, carbon dioxide or air, if transparency is required, and if no transparency is required, it is preferable to use not only any gas as mentioned above, but also paraffin or wax which is a liquid at an elevated temperature during filling, and a solid at a normal temperature thereafter. The filling material makes it possible to maintain a comfortable environment in a vehicle by restraining the escape of cool air from the vehicle and the infiltration of heat from outside in summer and the escape of warm air and the infiltration of cold air in winter. The double-wall structure having a hollow space therein damps or absorbs the energy of noise from outside, and ensures a calm environment in the vehicle. If such a structure is applied to a hood, it is possible to reduce any radiant noise and heat coming out from the engine compartment.

The integrally molded or formed product of this invention having a hollow structure can be made by employing, for example, a common vacuum and pressure forming, injection or blow molding, or press forming process without any particular limitation, and for example, the following processes will be suitable.

According to a first process, two resin sheets formed from the resin composition of this invention are fixed in a holder having a path for introducing a pressurized fluid, and the holder is sealed by a known method to form a closed space between the two sheets. The sheets are heated to at least their deflection temperature under load, and set in an open mold, and the softened sheets are welded together along their outer peripheral sections pressed together by the mold. A pressurized fluid is introduced into the closed space between the two sheets during their welding or thereafter, and during the expansion of the sheets or thereafter, the mold is closed and the pressure of the fluid is maintained until a molded product is cooled to form a hollow structure. The mold preferably has an evacuating hole for evacuating the space between the mold surface and each sheet to bring them into intimate contact with each other. Such evacuation gives a molded product of improved transferability. According to a tenth aspect of this invention, therefore, there is provided a process for manufacturing an integrally molded or formed resin product which comprises heating two resin sheets containing the resin composition as described before, placing them in an open mold, introducing a pressurized fluid between the sheets before welding them together along their edges or thereafter, and closing the mold during the expansion of the sheets or thereafter, and maintaining the fluid pressure to form a hollow structure.

According to a second process, a closed mold is retracted to have its cavity enlarged, while it is filled with a molten resin composition according to this invention, or thereafter, and a pressurized fluid is introduced into the molten resin to form a hollow structure.

According to a third process, one or two resin sheets containing the resin composition of this invention are inserted along the cavity surface of an open mold, and while a molten resin is fed into the closed mold between the two sheets or behind one and the only sheet, or thereafter, a pressurized fluid is introduced into the molten resin to form a hollow structure, while the volume of the cavity is enlarged. More specifically, one resin sheet formed from the resin composition is inserted along the cavity surface on one side of an open mold, and while a molten resin is fed to fill the cavity behind the sheet, or thereafter, a pressurized fluid is introduced into the molten resin to form a hollow structure, while the mold is retracted to enlarge the volume of the cavity, or two resin sheets are inserted along the cavity surfaces on both sides of a mold, and while a molten resin is fed to fill the cavity between the sheets, a pressurized fluid is introduced into the molten resin to form a hollow structure, while the volume of the cavity is enlarged. The resin to be used to fill may be any resin adhering closely to the sheet or sheets containing the resin composition of this invention, and preferably having a solubility parameter (SP) close to that of the resin composition of this invention. It is possible to use as such one or more of the thermoplastic resins (D) employed in the thermoplastic resin laminate as described before.

The integrally molded or formed resin product of this invention having a hollow structure is applicable to, for example, a hood 131, a door 132, a back door 133, a roof 134, a fender 135, a window 136, a trunk lid 137, a center console box 141, a pillar garnish 142, an instrument panel 143, or a head lining, as shown in FIGS. 13A and 13B or FIGS. 14A and 14B. Any of these parts can be molded or formed with an inner or outer, an auxiliary part, or a reinforcement to make a unitary combination to thereby reduce the number of parts and process steps. Moreover, a hollow part filled with a gas, liquid, or solid, or a mixture thereof can be used to perform additional functions. For example, the hood can be combined with a reinforcement, and can be used to perform sound-proofing and heat-insulating functions, and the roof can be combined with a head lining, and can be used to perform heat-insulating and sound-proofing functions, while each door or fender can be combined with an inner and an outer.

Figure 15:
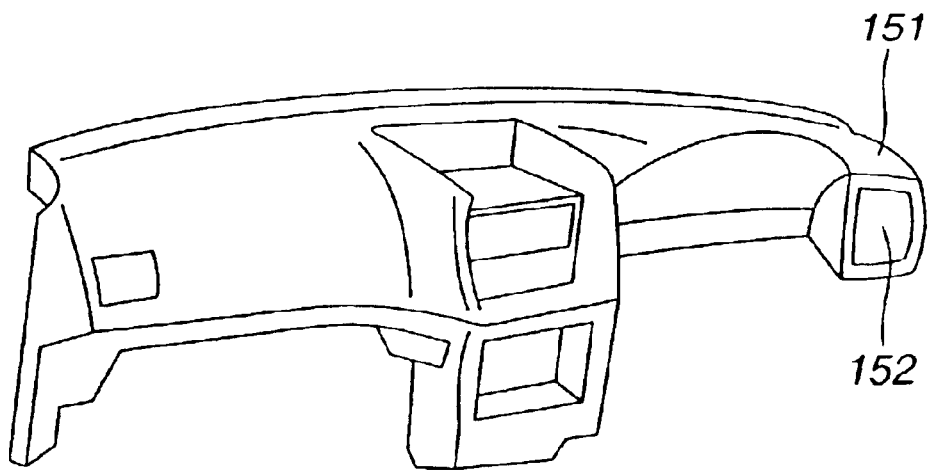
FIG. 15 is a schematic perspective view of an integrally molded product which is formed using the resin composition according to the present invention.

According to an eleventh aspect of this invention, there is provided an integrally molded or formed product formed from the resin composition of this invention and combining two or more kinds of parts having different functions to form a single part having at least two such functions. Examples of the different functions are the function of a display as of an instrument panel, the function of ventilation as of an air conditioner duct, and the function of fixing as of a roof rail. Owing to a broad range of properties including high rigidity, high heat resistance, dimensional stability after heating or molding, and chemical resistance, the resin composition of this invention is applicable to various parts expected to perform various functions and can be used to make an integrally molded product combining two or more kinds of parts having different functions to form a single part having at least two such functions. It is, therefore, suitable for making a large part in a module, or an integrated form to reduce the number of parts and process steps and the weight of parts, while retaining high quality. For example, FIG. 15 shows an instrument panel as a large part for the interior of an automotive vehicle, and it is usual practice to prepare a panel 151, an air duct and case 152 for an air conditioner and a cross car beam (a steering cross member) separately and put them together in a vehicle manufacturing line. It has been difficult to mold an integral combination of the panel and the air duct and case for an air conditioner from any conventional resinous material, since it results in a large and complex shaped product which is likely to shrink or warp during molding, or expand under heat, but these problems can be overcome if the resin composition of this invention is used. Owing to its high rigidity, the resin composition of this invention can combine those parts into a unitary structure, while eliminating any cross car beam (steering cross member) that has hitherto been made of steel. The resin composition of this invention can also combine a bracket, or the like that would have had to be prepared separately if it had been made of steel. It also enables a unitary combination including a skin, or like ornamental material to be made by insert molding. Similar results can also be obtained from its application to, for example, a door. A door inner panel is presently mainly of steel, and is assembled with various other parts, such as a side window guide rail, a regulator, a door lock and a speaker, in a manufacturing line. The resin composition of this invention can combine a door inner panel, a guide rail, a speaker housing, etc.

Figure 16:
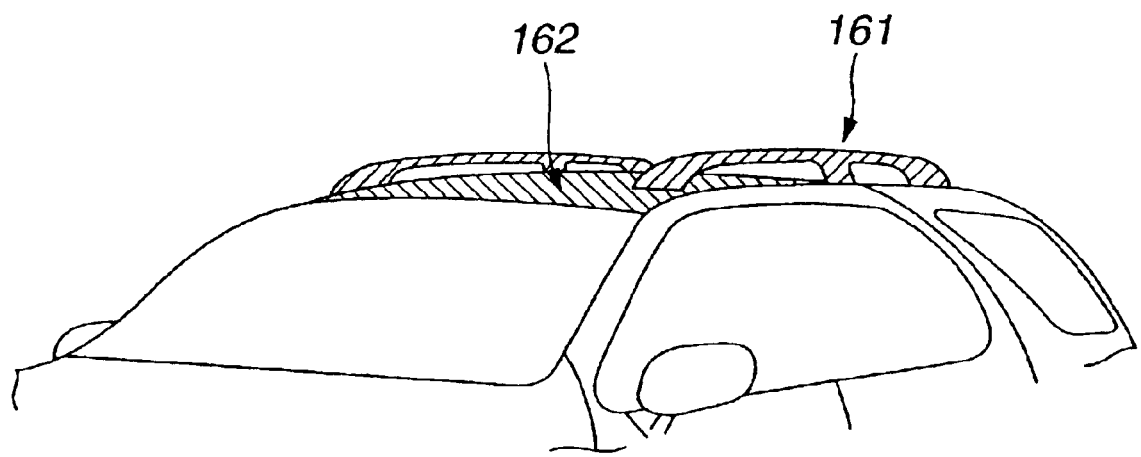
FIG. 16 is a schematic fragmentary perspective view of an upper part of an automotive vehicle provided with an integrally molded product which is formed using the resin composition according to the present invention.

FIG. 16 shows another example of an integrally molded assembly according to this invention. FIG. 16 shows roof rails 161 as large parts for the exterior of an automotive vehicle which are combined with a roof panel 162 formed from the resin composition of this invention. The roof rails have been difficult to form from any conventional resinous material because of rigidity and heat resistance, since they have to bear a heavy weight and are likely to be exposed to severe temperature conditions. These problems can be overcome by the resin composition of this invention. Similar results can be obtained from its application to, for example, a spoiler, as a spoiler can be combined with a trunk lid formed from the resin composition of this invention.

Figure 17:
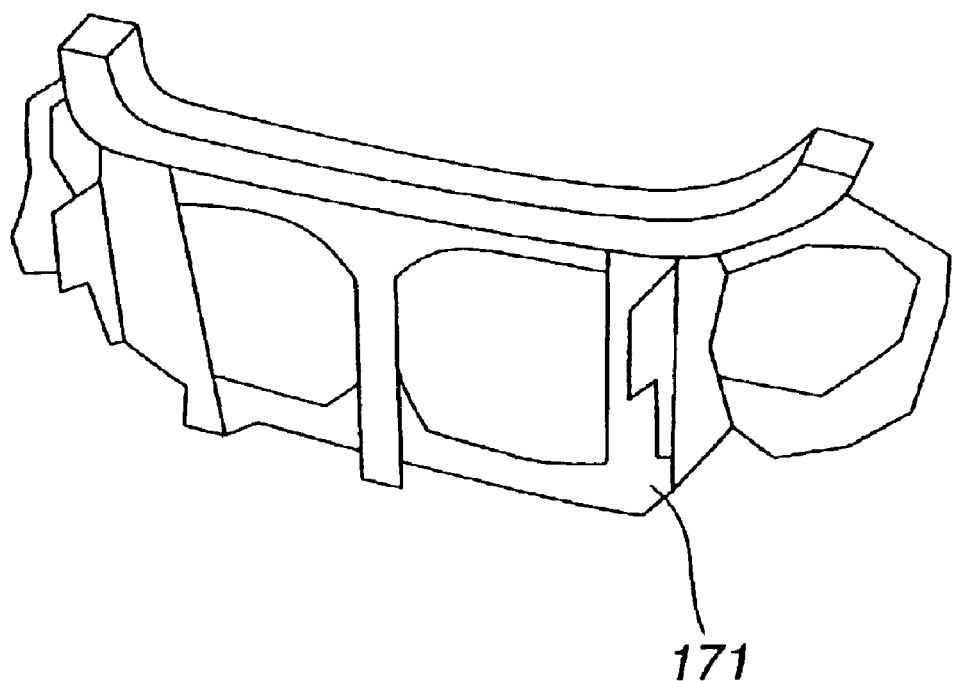
FIG. 17 is a schematic perspective view of an integrally molded product which forms part of an automotive vehicle and formed using the resin composition according to the present invention.

FIG. 17 shows a radiator core support as a large vehicle part 171. Although a resinous radiator core support 171 is appearing as a front end module, the resin composition of this invention can make a part of higher heat resistance, chemical resistance and rigidity and lighter weight, and combine it with a fan shroud, a bracket, etc. The resin composition of this invention can combine transparent parts, such as a radiator reservoir tank and a headlamp cover, as well as a bumper reinforcement which has hitherto been a separate member. Owing to its high heat and chemical resistance and low linear expansibility, the resin composition of this invention is useful for combining parts in an engine compartment, such as an air cleaner and a throttle chamber. Although attempts have already been made to realize an integral combination of those parts, the engine compartment creates a severe environment by a high temperature and the presence of oil and other chemicals, and presents problems yet to be overcome by any conventional resinous material, but those problems can be overcome by the resin composition of this invention. Similar results can be obtained from its application to an intake manifold and a cylinder head cover, and they can be combined with the parts mentioned above.

Although the integrally molded or formed combination of this invention can be formed from the resin composition of this invention alone, it may also be composed of a multi-layer laminate formed by laminating the resin composition of this invention with another resin. Such a laminate has at least one layer formed from the resin composition of this invention, and preferably has its outermost and lowermost layers, and more preferably a middle layer, too, formed from the resin composition of this invention. The multi-layer laminate provides additional functions not achieved by the resin composition of this invention alone. The thermoplastic resin laminate as described before can be used as such a multi-layer laminate.

Owing to its high rigidity, heat resistance and dimensional stability after heating or molding, the resin composition of this invention is suitable for an integrally molded combination including a part having a movable portion and an unmovable portion, such as a throttle chamber. Many parts having movable and unmovable portions are used in an intake or exhaust system or an air conditioning unit in an automotive vehicle. These parts are mainly intended for controlling the flow of gas, such as air, and each part is composed of a cylindrical portion defining a gas passage and a cover which can be opened and closed to control the flow of the gas, and gas tightness is important for any such part, as is the case with, for example, each door for a throttle chamber or in an air conditioning unit. The cylindrical and cover portions of any such part formed from any conventional resinous material are so low in dimensional accuracy because of high degrees of molding shrinkage and thermal expansion that the cover portion is unsatisfactory in gas tightness. Heat resistance has been another problem imposed by any part for installation in an engine compartment. Owing to its low thermal expansibility and contractibility, and high heat resistance, the resin composition of this invention can overcome those problems and make a part of high gas tightness. Owing to its high rigidity, the resin composition of this invention can also achieve a reduction in weight of any such part and a corresponding improvement of its response.

Although a molded or formed product having movable and unmovable portions according to this invention can be made if its movable and unmovable portions are separately prepared by, for example, injection molding, and put together, its movable and unmovable portions are preferably made as an integral combination by, for example, two-color molding. In this way, it is possible to achieve a still higher level of gas tightness and a reduction in the number of process steps and parts. A throttle chamber is shown in FIGS. 18A and 18B, and can be manufactured by, for example, a process which will now be described.

The throttle chamber has a cylindrical chamber portion 181 as an unmovable portion, a valve 182 as a movable portion and a metal shaft 183 for the valve. The metal shaft for the valve is first set in a mold for two-color molding, the cylindrical chamber portion is made by injection molding, a slide core is retracted for molding the circular valve, and the circular valve is made by injection molding. The metal shaft and the circular valve are united as an integral combination. This invention is also preferred for application to a cylindrically molded product having an unmovable portion for introducing a flowing gas, and a movable portion defining a cover to be opened or closed for controlling the flow of the gas.

Figure 19:
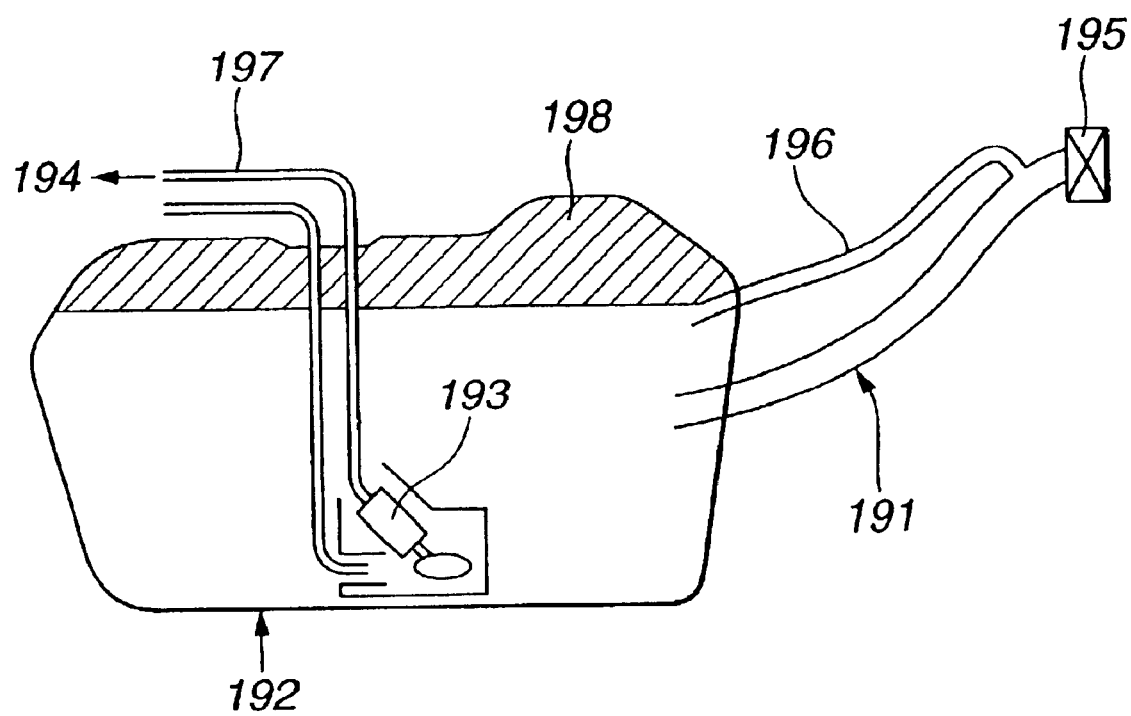
FIG. 19 is a schematic sectional view of a fuel supply system including various parts which are formed using the resin composition according to the present invention.

Owing to its excellent property of shutting off any hydrocarbon fuel, its excellent property as a gas barrier and its high chemical resistance, the resin composition of this invention is suitable for a part or container for holding any hydrocarbon fuel, such as a fuel tank or any other part of a fuel supply system in an automotive vehicle, or an item for domestic use, such as kerosene container. FIG. 19 shows a resinous fuel tank in a motor, or other vehicle, as such a part or container. It shows a fuel supply system in which gasoline, which is a hydrocarbon fuel, is introduced through a filler tube 191 for storage in a fuel tank 192, and is forced by a fuel pump 193 into an engine 194. The resin composition of this invention is applicable to parts for the fuel supply system, such as fuel tank 192, a filler cap 195, a vent tube 196, a fuel hose 197, a fuel cutoff valve, a delivery valve, an evaporation tube, a return tube and a fuel sender module. The fuel tank is the largest of the parts for the fuel supply system in the vehicle. There has recently been an increasing use of a resinous material for fuel tanks, and owing to an increased freedom available in the selection of shapes for parts, a resinous tank can hold about 10 liters more fuel than a metallic one, and is about 25% lighter in weight. These advantages have brought about greater expectations for resinous fuel tanks. The following is a detailed statement of the present status of the use of a resinous material for fuel tanks and the problems involved therein.

It has been usual to use HDPE (high density polyethylene), an olefin resin, as a matrix resin for a fuel tank and blow molding as a process for manufacturing it. While there has not been any great change in such material or process, there has been a great change in the layer structure of the tank. For example, the fuel tank was at first of the single layer type, but the enactment of the law for restraining the evaporation of hydrocarbons has made it essential to form a fuel tank with a multi-layer wall for reducing the permeation of hydrocarbons. As a result, fuel tanks are now mainly of a multi-layer wall structure composed of five layers of three kinds of materials, i.e. a mixture of HDPE and PA (polyamide), a mixture of HDPE and EVOH (ethylene-vinyl acetate copolymer) and HDPE on both sides. They are made by blow molding as usual.

The permeation of a large amount of hydrocarbon fuel through the wall of a single-layer type fuel tank is apparently due to good compatibility between the material of the tank and the fuel. HDPE has a solubility parameter of 7.9, while the hydrocarbon fuel has a SP of 6 to 8, and their SP's fall within the same range. On the other hand, PA used in the wall of a multi-layer type tank has a SP of 13.6 differing greatly from that of the fuel, or in other words, they are low in compatibility. Thus, the PA material in a multi-layer type fuel tank is employed as a barrier layer for preventing the escape of hydrocarbon fuel from the tank by permeation. The development of a multi-layer fuel tank has made it possible to establish a technique for satisfying the law for restraining the evaporation of hydrocarbons, but has brought about a sharp increase in price of such tanks due to the complicated molding process which they require. Moreover, the laminated structure formed by a plurality of resins is not easy to recycle, but has presented a new problem in failing to cope with the current requirements of a recycling society.

The modified silica compound or composition in the resin composition of this invention has a SP exceeding 11 owing to the remaining silanol groups, and acts as a barrier against the permeation of hydrocarbon fuel like PA or EVOH as mentioned above. The resin composition consists mainly of a resin containing polar groups, such as acrylic, and having a SP above 11, which is low in compatibility with gasoline as hydrocarbon fuel, and a desirable material for fuel tanks. Thus, the resin composition of this invention has been found to provide a fuel tank for a vehicle which satisfies legal regulations concerning the evaporation of hydrocarbons, even if it may be of the type having a single-layer wall. It has enabled a fuel tank to be manufactured at a low cost and also respond to the social requirements for recycling. The resin composition of this invention is applicable not only to a fuel tank for a vehicle, but also to an article for domestic use, such as a kerosene container. It reduces the evaporation of kerosene into the air and contributes to preserving a sound global environment.

While it has been discussed before that the thermoplastic resin laminate comprises at least one layer of each of the resin composition (C) and the thermoplastic resin (D), the resin composition (C) and the thermoplastic resin (D) forming alternating layers, it will be understood that there may be a case in which the laminate includes not less than three (odd number) layers and is arranged such that the uppermost and lowermost layers are formed of the resin composition (C) or the thermoplastic resin (D). By thus forming the outermost (uppermost and lowermost) layers of the same resin, rigidity distribution of the laminate can be regulated thereby controlling a direction of distortion of the laminate under a thermal deformation.

EXAMPLES

The resin composition (C) embodying this invention and the process for manufacturing it will now be described in detail by way of examples, though this invention is not limited thereto.

Experiment 1

Example 1

A thorough mixture was made of 190 g of refined methyl methacrylate, 10 g of 2-hydroxyethyl methacrylate and 22 g of a powder of a silica compound having a surface subjected to a hydrophobicity-providing treatment (AEROSIL R974 of Nippon Aerosil Co., Ltd. having an average primary particle diameter of 12 nm and treated with dimethyldichlorosilane), and was put in a three-necked flask with 1.5 g of AIBN (azobisisobutyronitrile), 1.5 g of dodecyl sodium sulfate, 20 g of sodium hydrogen phosphate and 800 g of water, and they were allowed to react for about six hours at a liquid temperature of 80 deg. C. (° C.) under vigorous stirring, carrying out gas purging with nitrogen. After completion of the reaction, the reaction product was collected by filtration, washed in water thoroughly, and dried under a reduced pressure to yield a particle resin composition as intended. A test specimen was prepared from it by hot press forming. This is Example 1.

Example 2

A thorough mixture was made of 190 g of refined methyl methacrylate, 10 g of methacrylamide and 22 g of a powder of a silica compound having a surface subjected to a hydrophobicity-providing treatment (AEROSIL R974 of Nippon Aerosil Co., Ltd. having an average primary particle diameter of 12 nm and treated with dimethyldichlorosilane), and was put in a three-necked flask with 1.5 g of AIBN (azobisisobutyronitrile), 1.5 g of dodecyl sodium sulfate, 20 g of sodium hydrogen phosphate and 800 g of water, and they were allowed to react for about six hours at a liquid temperature of 80 deg. C. under vigorous stirring, carrying out gas purging with nitrogen. After completion of the reaction, the reaction product was collected by filtration, washed in water thoroughly, and dried under a reduced pressure to yield a particle resin composition as intended. A test specimen was prepared from it by hot press forming. This is Example 2.

Example 3

A thorough mixture was made of 190 g of refined methyl methacrylate, 10 g of 2-(diethylamino)ethyl methacrylate and 22 g of a powder of a silica compound having a surface subjected to hydrophobicity-providing treatment (AEROSIL R974 of Nippon Aerosil Co., Ltd. having an average primary particle diameter of 12 nm and treated with dimethyldichlorosilane), and was put in a three-necked flask with 1.5 g of AIBN (azobisisobutyronitrile), 1.5 g of dodecyl sodium sulfate, 20 g of sodium hydrogen phosphate and 800 g of water, and they were allowed to react for about six hours at a liquid temperature of 80 deg. C. under vigorous stirring, carrying out gas purging with nitrogen. After completion of the reaction, the reaction product was collected by filtration, washed in water thoroughly, and dried under a reduced pressure to yield a particle resin composition as intended. A test specimen was prepared from it by hot press forming. This is Example 3.

Example 4

A thorough mixture was made of 190 g of refined methyl methacrylate, 10 g of methyl vinyl ketone and 22 g of a powder of a silica compound having a surface subjected to a hydrophobicity-providing treatment (AEROSIL R974 of Nippon Aerosil Co., Ltd. having an average primary particle diameter of 12 nm and treated with dimethyldichlorosilane), and was put in a three-necked flask with 1.5 g of AIBN (azobisisobutyronitrile), 1.5 g of dodecyl sodium sulfate, 20 g of sodium hydrogen phosphate and 800 g of water, and they were allowed to react for about six hours at a liquid temperature of 80 deg. C. under vigorous stirring, carrying out gas purging with nitrogen. After completion of the reaction, the reaction product was collected by filtration, washed in water thoroughly, and dried under a reduced pressure to yield a particle resin composition as intended. A test specimen was prepared from it by hot press forming. This is Example 4.

Example 5

A thorough mixture was made of 190 g of refined methyl methacrylate, 10 g of glycidyl methacrylate and 22 g of a powder of a silica compound having a surface subjected to a hydrophobicity-providing treatment (AEROSIL R974 of Nippon Aerosil Co., Ltd. having an average primary particle diameter of 12 nm and treated with dimethyldichlorosilane), and was put in a three-necked flask with 1.5 g of AIBN (azobisisobutyronitrile), 1.5 g of dodecyl sodium sulfate, 20 g of sodium hydrogen phosphate and 800 g of water, and they were allowed to react for about six hours at a liquid temperature of 80 deg. C. under vigorous stirring, carrying out gas purging with nitrogen. After completion of the reaction, the reaction product was collected by filtration, washed in water thoroughly, and dried under a reduced pressure to yield a particle resin composition as intended. A test specimen was prepared from it by hot press forming. This is Example 5.

Example 6

A thorough mixture was made of 190 g of refined methyl methacrylate, 10 g of 2-hydroxyethyl methacrylate and 22 g of a powder of a titania compound having a surface subjected to a hydrophobicity-providing treatment (TTO-51(C) of Ishihara Sangyo Kaisha, Ltd. having an average primary particle diameter of 10 to 30 nm and treated with $Al_2O_3$ and stearic acid), and was put in a three-necked flask with 1.5 g of AIBN (azobisisobutyronitrile), 1.5 g of dodecyl sodium sulfate, 20 g of sodium hydrogen phosphate and 800 g of water, and they were allowed to react for about six hours at a liquid temperature of 80 deg. C. under vigorous stirring, carrying out gas purging with nitrogen. After completion of the reaction, the reaction product was collected by filtration, washed in water thoroughly, and dried under a reduced pressure to yield a particle resin composition as intended. A test specimen was prepared from it by hot press forming. This is Example 6.

Comparative Example 1

A three-necked flask was charged with 200 g of refined methyl methacrylate, 1.5 g of AIBN (azobisisobutyronitrile), 1.5 g of dodecyl sodium sulfate, 20 g of sodium hydrogen phosphate and 800 g of water, and they were allowed to react for about six hours at a liquid temperature of 80 deg. C. under vigorous stirring, carrying out gas purging with nitrogen. After completion of the reaction, the reaction product was collected by filtration, washed in water thoroughly, and dried under a reduced pressure to yield a particle resin composition as intended. A test specimen was prepared from it by hot press forming. This is Comparative Example 1.

Comparative Example 2

A thorough mixture was made of 200 g of refined methyl methacrylate and 22 g of a powder of a silica compound having a surface subjected to hydrophobicity-providing treatment (AEROSIL R974 of Nippon Aerosil Co., Ltd. having an average primary particle diameter of 12 nm and treated with dimethyldichlorosilane), and was put in a three-necked flask with 1.5 g of AIBN (azobisisobutyronitrile), 1.5 g of dodecyl sodium sulfate, 20 g of sodium hydrogen phosphate and 800 g of water, and they were allowed to react for about six hours at a liquid temperature of 80 deg. C. under vigorous stirring, carrying out gas purging with nitrogen. After completion of the reaction, the reaction product was collected by filtration, washed in water thoroughly, and dried under a reduced pressure to yield a particle resin composition as intended. A test specimen was prepared from it by hot press forming. This is Comparative Example 2.

The test specimens as stated above were evaluated for their physical properties as follows. The results are shown in Table 1.
(1) Bending modulus: Determined by the ASTM D790 testing method using the test specimen of the shape of a rod having a diameter of 6.4 mm.
(2) Total light transmittance: Determined by the ASTM D1003 testing method using the specimen of the shape of plate having a thickness of 2 mm.
(3) Izod impact strength: Determined by the ASTM D256 testing method using the specimen of the shape of a rod having a diameter of 6.4 mm and formed with a notch.
(4) The shift of the peak in the infrared absorption spectrum ($\Delta\nu OH$) was calculated.

TABLE 1

|  | Bending modulus (GPa) | Total light transmittance (%) | Izod impact strength (J/m) | $\Delta\nu OH$ |
|---|---|---|---|---|
| Example 1 | 3.6 | 90 | 15.0 | 350 cm$^{-1}$ |
| Example 2 | 4.0 | 90 | 15.2 | 550 cm$^{-1}$ |
| Example 3 | 4.2 | 90 | 15.5 | 970 cm$^{-1}$ |
| Example 4 | 3.6 | 90 | 15.1 | 340 cm$^{-1}$ |
| Example 5 | 3.8 | 90 | 15.1 | 480 cm$^{-1}$ |
| Example 6 | 3.4 | 89 | 15.0 | 320 cm$^{-1}$ |
| Comparative Example 1 | 3.0 | 93 | 16.0 | — |
| Comparative Example 2 | 3.5 | 91 | 12.8 | — |

All of the test specimens formed from the resin compositions as obtained in Examples 1 to 6 were of greatly improved rigidity over Comparative Example 1 without showing any substantial reduction in transparency or impact strength. Comparative Example 2 showed a great reduction in impact strength without being greatly improved in rigidity. As is obvious from the foregoing, all of the examples embodying this invention were superior to both of the comparative examples in bending modulus and Izod impact strength, while having a satisfactorily high total light transmittance.

Experiment 2

Moreover, laminates embodying this invention were prepared and evaluated with respect to the following items:
Evaluation of Laminates:
(1) The total light transmittance was measured by a Haze meter (HM-65 of Murakami Color Research Institute). The evaluation was made as G(good): $\geq 90$ and NG(not good): <90.
(2) The Rockwell hardness was measured by a Rockwell hardness meter (M scale). The evaluation was made as G (good): $\geq 95$ and NG(Not good): <95.
(3) The bending modulus was measured by an Autograph (DCS-10T of Shimadzu Corporation). The evaluation was made as G(good): $\geq 3500$ MPa and NG(not good): <3500 MPa.
(4) Impact resistance: A 200 mm square laminate was fixed along all of its peripheral edges by a 180 mm square frame. Then, a steel ball conforming to the JIS-R3212 impact resistance test method was allowed to fall from different heights onto the laminate, and the height which caused cracking was determined. The evaluation was made as G(good): ≧3 m and NG(not good): <3 m.

(5) Separation of layers: Each laminate was bent by about 90 degrees and was visually inspected for any separation of layers. The evaluation was made as G(good): No separation, and NG(not good): Separation found.

(6) Distortion: A test specimen measuring 100 mm by 50 mm was cut out from each laminate to be tested and was subjected 10 times to a cycle test consisting of two hours of heating at 110 deg. C. in an oven and allowing it to cool for at least two hours at room temperature. Thereafter, the test specimen was visually inspected for distortion. This evaluation was conducted on each of the three test specimens (n=3). The evaluation was made as G(good): No distortion, and NG(not good): Distortion found.

Example 7

A laminate having a width of 300 mm was prepared from the resin composition according to Example 1 and a polycarbonate resin (Iupilon E200U of Mitsubishi Engineering-Plastics Corporation) by using two extruders and a T-die having three slits. The laminate was a three-layer structure composed of an upper layer of an acrylic resin containing silica compound [resin composition (C)], a middle layer of a polycarbonate resin not containing silica [resin (D)] and a lower layer of the same acrylic resin containing silica compound as the upper layer [resin composition (C)]. The upper, middle and lower layers were respectively 1, 3 and 1 mm in thickness. Each layer of the acrylic resin containing silica compound was such that the resin composition (C) contained 5% by weight of the silica compound. The laminate was evaluated as discussed above. The results of evaluation are shown in Table 2. Referring to the results of overall evaluation in Table 2, G means that the results were good in all of the items of evaluation, while NG means that the results were not good in one or more items.

Example 8

A procedure of Example 7 was repeated to prepare a laminate with the exception that the layer of the acrylic resin containing silica compound was such that the resin composition (C) contained 1% by weight of the silica compound. The laminate was likewise evaluated. The results are shown in Table 2.

Example 9

A procedure of Example 7 was repeated to prepare a laminate with the exception that the layer of the acrylic resin containing silica compound was such that the resin composition (C) contained 30% by weight of the silica compound. The laminate was likewise evaluated. The results are shown in Table 2.

Example 10

A procedure of Example 7 was repeated to prepare a laminate with the exception that the discharge capacity of the extruders was lowered and the widths of slits of the T-dies were changed to form the upper layer of the resin composition (C) having a thickness of 0.1 mm, the middle layer of resin (D) having a thickness of 0.3 mm and the lower layer of resin composition (C) having a thickness of 0.1 mm. The laminate was likewise evaluated. The results are shown in Table 2.

Example 11

A procedure of Example 7 was repeated to prepare a laminate with the exception that the discharge capacity of the extruders was increased and the widths of slits of the T-dies were changed to form the upper layer of the resin composition (C) having a thickness of 2 mm, the middle layer of resin (D) having a thickness of 6 mm and the lower layer of resin composition (C) having a thickness of 2 mm. The laminate was likewise evaluated. The results are shown in Table 2.

Example 12

A procedure of Example 7 was repeated to prepare a laminate with the exception that the discharge capacity of the extruders was adjusted and T-dies adapted to form a laminate of five layers are employed, the five layers including alternate layers of the resin composition (C) and the resin (D). The arrangement of the layers was the resin composition C/the resin D/the resin composition C/the resin D/the resin composition C, and the layers were respectively 0.7, 1.5, 0.6, 1.5 and 0.7 mm in thickness. The laminate was likewise evaluated. The results are shown in Table 2.

Comparative Example 3

A procedure of Example 7 was repeated to prepare a laminate with the exception that the layer of the acrylic resin containing silica compound was replaced with a layer of acrylic resin which did not contain the silica compound and therefore formed of an acrylic resin (referred hereafter a resin (C')) so as to form a three-layer laminate having a thickness of 5 mm. The laminate was likewise evaluated. The results are shown in Table 2.

The entire contents of Japanese Patent Application P2001-334592 (filed Oct. 31, 2001) and Japanese Patent Application P2002-188414 (filed Jun. 27, 2002) are incorporated herein by reference.

Although the invention has been described above by reference to certain embodiments and examples of the invention, the invention is not limited to the embodiments and examples described above. Modifications and variations of the embodiments and examples described above will occur to those skilled in the art, in light of the above teachings. The scope of the invention is defined with reference to the following claims.

TABLE 2

| | Example 7 | Example 8 | Example 9 | Example 10 | Example 11 | Example 12 | Comparative Example 3 |
|---|---|---|---|---|---|---|---|
| Sample | | | | | | | |
| Number of layers | 3 | 3 | 3 | 3 | 3 | 5 | 3 |
| Layer arrangement (*1) | C/D/C | C/D/C | C/D/C | C/D/C | C/D/C | C/D/C/D/C | C'/D/C' |

TABLE 2-continued

|  | Example 7 | Example 8 | Example 9 | Example 10 | Example 11 | Example 12 | Comparative Example 3 |
|---|---|---|---|---|---|---|---|
| Thickness (mm) of laminate | 5 | 5 | 5 | 0.5 | 10 | 5 | 5 |
| Silica content (wt %) in layer C or C' | 5 | 1 | 30 | 5 | 5 | 5 | 0 |
| Evaluation |  |  |  |  |  |  |  |
| Total light transmittance | G | G | G | G | G | G | G |
| Rockwell hardness | G | G | G | G | G | G | NG |
| Bending modulus | G | G | G | G | G | G | G |
| Impact resistance | G | G | G | G | G | G | G |
| Layer separation | G | G | G | G | G | G | NG |
| Distortion | G | G | G | G | G | G | NG |
| Overall evaluation | G | G | G | G | G | G | NG |

(*1): Layer C—Acrylic resin containing silica compound subjected to a hydrophobicity-providing treatment;
Layer D—Polycarbonate resin (not containing any silica); and
Layer C'—Acrylic resin (not containing any silica).

What is claimed is:

1. A resin composition comprising:
   a copolymer (A) formed by copolymerization of a first unsaturated monomer (a) and a second monomer (b), the first unsaturated monomer having a functional group which is bondable by hydrogen bond to a hydroxyl group, the second monomer being copolymerizable with the first unsaturated monomer; and
   a metal oxide (B) dispersed in the copolymer and having hydroxyl groups and hydrophobic groups at surface of the metal oxide.

2. A resin composition as claimed in claim 1, wherein the first unsaturated monomer (a) is an unsaturated monomer having a functional group which is bondable by hydrogen bond to a silanol group, and the metal oxide is a silica compound which has silanol groups and the hydrophobic groups at surface of the silica compound.

3. A resin composition as claimed in claim 1, wherein the second monomer is at least one selected from the group consisting of methacrylic monomer and acrylic monomer.

4. A resin composition as claimed in claim 1, wherein the functional group of the first unsaturated monomer (a) is at least one selected from the group consisting of hydroxyl group, amide group, amino group, imino group, epoxy group, ether group, carbonyl group, carboxyl group and sulfonic acid group.

5. A resin composition as claimed in claim 1, wherein the unsaturated monomer (a) is contained in an amount ranging from 0.1 to 30% by weight in the copolymer (A).

6. A resin composition as claimed in claim 1, wherein the second monomer (b) includes methyl methacrylate as a main component.

7. A resin composition as claimed in claim 1, wherein the metal oxide is contained in an amount ranging from 0.1 to 50% by weight in the resin composition.

8. A resin composition as claimed in claim 2, wherein the silica compound is a fine particle having a long diameter of not larger than 380 nm.

9. A resin composition as claimed in claim 8, wherein the fine particle has a long diameter ranging from 1 to 200 nm.

10. A thermoplastic resin laminate comprising:
    at least one layer of the resin composition (C) of claim 1; and
    at least one layer of a thermoplastic resin (D),
    wherein each layer of the resin composition (C) and each layer of the thermoplastic resin (D) are alternately laminated on each other.

11. A thermoplastic resin laminate as claimed in claim 10, wherein each layer of the resin composition (C) and each layer of the thermoplastic resin (D) are thermally welded to each other.

12. A thermoplastic resin laminate as claimed in claim 10, wherein the thermoplastic resin (D) is polycarbonate resin.

13. A thermoplastic resin laminate as claimed in claim 10, wherein at least one layer of the resin composition (C) and at least one layer of the thermoplastic resin constitute the thermoplastic resin laminate of not less than three layers and of an odd number.

14. An interior or exterior part of a vehicle, an outer panel of a vehicle, or a resinous window of a vehicle, formed of a resin composition comprising a copolymer (A) formed by copolymerization of a first unsaturated monomer (a) and a second monomer (b), the first unsaturated monomer having a functional group which is bondable by hydrogen bond to a hydroxyl group, the second monomer being copolymerizable with the first unsaturated monomer and a metal oxide (B) dispersed in the copolymer and having hydroxyl groups and hydrophobic groups at surface of the metal oxide.

15. A method of producing a resin composition (C) comprising:
    preparing a mixture liquid of a first unsaturated monomer (a) and a second mononer (b), the first unsaturated monomer having a functional group which is bondable by hydrogen bond to a silanol group, the second monomer being copolymerizable with the first unsaturated monomer, the second monomer being at least one selected from the group consisting of methacrylic monomer and acrylic monomer;
    mixing a metal oxide (B) in the mixture liquid, the metal oxide having silanol groups and hydrophobic groups at surface of the metal oxide; and
    polymerizing the first unsaturated monomer and the at least one selected from the group consisting of methacrylic monomer and acrylic monomer.

16. A method of producing the thermoplastic resin laminate of claim 10, wherein the thermoplastic resin laminate is formed under heat or under pressure.

17. A method of producing an interior or exterior part of a vehicle, comprising:
    inserting the thermoplastic resin laminate of claim 10 into a metallic mold; and
    filling a resin to be integral with an peripheral section of the thermoplastic resin laminate under an injection molding or a compression molding.

18. A resinous wiper system comprising the resin composition of claim 1.

19. A resinous door mirror stay comprising the resin composition of claim 1.

20. A resinous pillar comprising the resin composition of claim 1.

21. A resin formed product including a transparent portion and an opaque portion, at least the transparent portion comprising the resin composition of claim 1.

22. A resin formed product as claimed in claim 21, wherein the transparent portion and the opaque portion are formed integral with each other.

23. A resin formed product as claimed in claim 21, wherein the opaque portion is formed by being colored with a pigment dispersed in a resin forming the opaque portion.

24. A resin formed product as claimed in claim 21, wherein the opaque portion is formed by painting or printing made before or after formation of opaque portion.

25. A resin formed product as claimed in claim 21, wherein the opaque portion is formed by employing a colored sheet.

26. A window provided with a heating element, comprising the resin composition of claim 1.

27. A resinous mirror comprising the resin composition of claim 1.

28. A resinous lamp reflector comprising the resin composition of claim 1.

29. A resinous cover or case in an engine compartment, comprising the resin composition of claim 1.

30. A resinous cover or case as claimed in claim 29, wherein the resinous cover or case is transparent.

31. A resinous part of a cooling system, comprising the resin composition of claim 1.

32. A resinous integrally formed product having at least one of a hollow structure communicating with open air and a closed hollow structure which comprise the resin composition of claim 1.

33. A resinous integrally formed product as claimed in claim 32, comprising at least one of the hollow structure and the closed hollow structure is filled with at least one selected from the group consisting of gas, liquid, solid and a mixture thereof and is sealed.

34. A resinous integrally formed product as claimed in claim 32, comprising an outermost layer which is formed of an ornamental material.

35. A resinous integrally formed product as claimed in claim 32, wherein the resinous integrally formed product is an outer panel, an interior part or an exterior part of an automotive vehicle.

36. A method of producing a resinous integrally formed product of claim 32, comprising:

heating first and second resin sheets each comprising a resin composition comprising a copolymer (A) formed by copolymerization of a first unsaturated monomer (a) and a second monomer (b), the first unsaturated monomer having a functional group which is bondable by hydrogen bond to a hydroxyl group, the second monomer being copolymerizable with the first unsaturated monomer and a metal oxide (B) dispersed in the copolymer and having hydroxyl groups and hydrophobic groups at surface of the metal oxide;

inserting the heated first and second resin sheets into a mold in an open state;

pressing outer peripheral sections of the first and second resin sheets;

introducing a pressurized fluid into between the first and second resin sheets before or after welding the outer peripheral sections of the first and second resin sheets; and putting the mold in a closed state during or after expansion of the first and second sheets to keep the pressurized fluid between the first and second resin sheets so as to form a hollow structure.

37. A method of producing a resinous integrally formed product of claim 32, comprising:

filling a resin composition comprising a copolymer (A) formed by copolymerization of a first unsaturated monomer (a) and a second monomer (b), the first unsaturated monomer having a functional group which is bondable by hydrogen bond to a hydroxyl group, the second monomer being copolymerizable with the first unsaturated monomer and a metal oxide (B) dispersed in the copolymer and having hydroxyl groups and hydrophobic groups at surface of the metal oxide in a molten state into a mold in a closed state; and introducing a pressurized fluid into the resin composition in the molten state enlarging volume of a cavity of the mold, during or after filling the resin composition, so as to form a hollow structure.

38. A method of producing a resinous integrally formed product of claim 32, comprising:

putting one or two resin sheets comprising a resin composition comprising a copolymer (A) formed by copolymerization of a first unsaturated monomer (a) and a second monomer (b), the first unsaturated monomer having a functional group which is bondable by hydrogen bond to a hydroxyl group, the second monomer being copolymerizable with the first unsaturated monomer and a metal oxide (B) dispersed in the copolymer and having hydroxyl groups and hydrophobic groups at surface of the metal oxide onto a surface of a cavity of a mold in an open state;

filling a molten resin into a location behind the one resin sheet or into a location between the two resin sheets in the mold in a closed state; and introducing a pressurized fluid into the resin composition in the molten state enlarging volume of a cavity of the mold, during or after filling the resin composition, so as to form a hollow structure.

39. An integrally formed product comprising the resin composition of claim 1, the integrally formed product being a single part which is formed by combining not less than two parts which respectively have different functions so as to provide the single part with not less than two functions.

40. A formed product comprising a movable and an unmovable portion each of which including the resin composition of claim 1.

41. A formed product as claimed in claim 40, wherein the movable portion and the unmovable portion are formed as a single body by a two-color forming.

42. A formed product as claimed in claim 40, wherein the movable portion is a cover member to be opened and closed, and the unmovable portion is a cylindrical formed product through which gas flows.

43. A part or container for containing fuel of hydrocarbons, comprising the resin composition of claim 1.

44. A part or container as claimed in claim 43, wherein the part or contain forms part of a fuel supply system of a vehicle.

45. A part or container as claimed in claim 43, wherein the part or container is a fuel tank of a vehicle.

46. A part or container as claimed in claim 45, wherein the part or container is a fuel tank of a vehicle, formed by a blow molding.

47. An interior or exterior part of a vehicle, an outer panel of a vehicle, or a resinous window of a vehicle, formed of a thermoplastic resin laminate comprising:

at least one layer of the resin composition (C) comprising a copolymer (A) formed by copolymerization at a first unsaturated monomer (a) and a second monomer (b), the first unsaturated monomer having a functional group which is bondable by hydrogen bond to a hydroxyl group, the second monomer being copolymerizable with the first unsaturated monomer and a metal oxide (B) dispersed in the copolymer and having hydroxyl groups and hydrophobic groups at surface of the metal oxide; and at least one layer of a thermoplastic resin (D), wherein each layer of the resin composition (C) and each layer of the thermoplastic resin (D) are alternately laminated on each other.

* * * * *